United States Patent
Hong et al.

(10) Patent No.: US 7,463,269 B2
(45) Date of Patent: Dec. 9, 2008

(54) TEXTURE DATA COMPRESSION AND RENDERING IN 3D COMPUTER GRAPHICS

(75) Inventors: Qi He Hong, Bracknell (GB); Alexander Ralph Lyons, Bracknell (GB); Adam Michael Baumberg, Bracknell (GB); Jonathan Mark Sewell, Bracknell (GB)

(73) Assignee: Canon Europa N.V., Amstelveen (NL)

( * ) Notice: Subject to any disclaimer, the term of this patent is extended or adjusted under 35 U.S.C. 154(b) by 0 days.

(21) Appl. No.: 11/151,544

(22) Filed: Jun. 14, 2005

(65) Prior Publication Data

US 2006/0017722 A1  Jan. 26, 2006

(30) Foreign Application Priority Data

Jun. 14, 2004  (GB) ................. 0413242.9

(51) Int. Cl.
*G06T 15/00* (2006.01)
(52) U.S. Cl. ............................. 345/582; 345/419
(58) Field of Classification Search ............ 345/419, 345/582; 709/217
See application file for complete search history.

(56) References Cited

U.S. PATENT DOCUMENTS

| | | | | |
|---|---|---|---|---|
| 5,796,969 A * | 8/1998 | Orton et al. | ............... | 715/803 |
| 6,271,858 B1 * | 8/2001 | Dalal et al. | ............... | 345/582 |
| 6,297,834 B1 * | 10/2001 | Malzbender | ............... | 345/586 |
| 6,333,746 B1 * | 12/2001 | Vaswani et al. | ............... | 345/582 |
| 6,356,272 B1 * | 3/2002 | Matsumoto et al. | ......... | 345/582 |
| 6,639,594 B2 * | 10/2003 | Zhang et al. | ................ | 345/426 |
| 6,952,204 B2 | 10/2005 | Baumberg et al. | ........... | 345/420 |
| 6,954,212 B2 | 10/2005 | Lyons et al. | ................. | 345/582 |
| 6,975,326 B2 | 12/2005 | Baumberg et al. | ........... | 345/582 |
| 7,129,954 B2 * | 10/2006 | Sekine et al. | ............... | 345/582 |
| 2003/0160785 A1 | 8/2003 | Baumberg | ................. | 345/419 |
| 2003/0189567 A1 | 10/2003 | Baumberg | ................. | 345/419 |

(Continued)

FOREIGN PATENT DOCUMENTS

EP   1 204 073   5/2002

(Continued)

OTHER PUBLICATIONS

R.I. Hartley, "Euclidean Reconstruction from Uncalibrated Views", Applications of Invariance in Computer Vision, Mundy, Zisserman and Forsyth eds, pp. 237-255, Azores (1993).

(Continued)

*Primary Examiner*—Phu K Nguyen
(74) *Attorney, Agent, or Firm*—Fitzpatrick, Cella, Harper & Scinto

(57) ABSTRACT

View-dependent texture images and view-independent texture data for a 3D computer model are processed to compress each view-dependent texture image by subtracting the view-dependent data and view-independent data in a common 2D image space to generate a difference image, and compression encoding the difference image. The difference images, 3D computer model and view-independent texture data are transmitted to a second apparatus, where the difference data and view-independent texture data are recombined in a common 2D image space as part of the processing to render an image.

56 Claims, 19 Drawing Sheets

U.S. PATENT DOCUMENTS

| | | | |
|---|---|---|---|
| 2004/0196294 A1 | 10/2004 | Hong et al. | 345/582 |
| 2005/0151751 A1 | 7/2005 | Hong et al. | 345/582 |
| 2005/0190179 A1 | 9/2005 | Hong et al. | 345/419 |

FOREIGN PATENT DOCUMENTS

| | | |
|---|---|---|
| EP | 1 267 309 | 12/2002 |
| WO | WO 01/39124 | 5/2001 |

OTHER PUBLICATIONS

K. Nishino, "Eigen Texture Method: Appearance Compression and Synthesis Based on a 3D Model", IEEE Transactions on Pattern Analysis and Machine Intelligence, vol. 23, No. 11, pp. 1257-1265 (Nov. 2001).

M. Magnor, "Multi-View Coding for Image-Based Rendering Using 3-D Scene Geometry", IEEE Transactions on Circuits and Systems for Video Technology, vol. 13, No. 11, pp. 1092-1106 (Nov. 2003).

\* cited by examiner

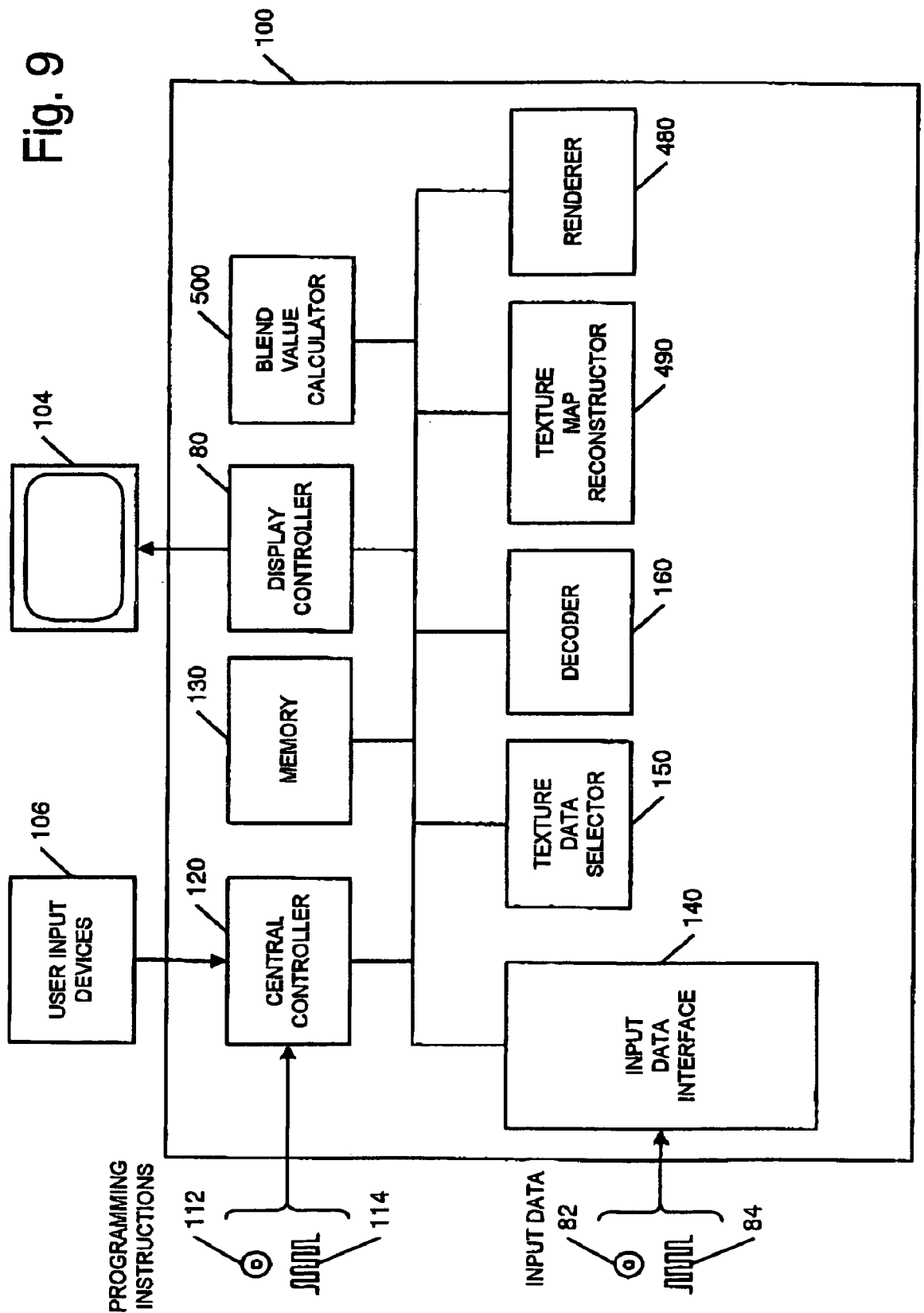

TEXTURE DATA COMPRESSION AND RENDERING IN 3D COMPUTER GRAPHICS

This application claims the right of priority under 35 U.S.C. § 119 based on British Patent Application Number 0413242.9, filed 14 Jun. 2004, which is hereby incorporated by reference herein in its entirety as if fully set forth herein.

The present invention relates to the field of three-dimensional (3D) computer graphics, and more particularly to the compression of texture data and the subsequent use of the texture data in rendering images of a three-dimensional computer model.

The technique of texture mapping is well known in the field of 3D computer graphics. In this technique, an image (either a digitized camera image or a synthetic image) known as a "texture map" is stored and mapped on to one or more surfaces of a three-dimensional computer model during rendering to represent surface detail in the final image of the model. The texture map is made up of a two-dimensional matrix of individual elements known as "texels" (like the pixels of an image) and, typically, a respective red (R), green (G) and blue (B) value is stored for each texel to define the texture data in the texture map.

Coordinates defining a point in the texture map are assigned to each vertex of each polygon in the 3D computer model. In this way the assigned texture map coordinates for a polygon's vertices define a corresponding polygon in the texture map containing the texture data which is to be mapped on to the 3D model polygon during rendering. The texture data assigned to each polygon in the 3D computer model is therefore constant, and so the same texture data is applied to a polygon for every viewing position and direction from which the polygon is rendered. As a result, the texture data is said to be "view-independent".

A problem occurs, however, when the texture data in the texture map is real image data from one or more camera images.

More particularly, the illumination, shadows and reflections in a real camera image are only correct for one particular viewing position and direction (that is, those from which the image was recorded relative to the object and the scene light sources). When the viewing position and/or direction from which the 3D computer model is viewed changes, the viewer would expect to see the illumination, shadows and reflections in the rendered image change accordingly. However, because the same texture data is mapped onto the 3D computer model regardless of the viewing position and direction, these changes are not seen and instead the viewer sees errors in the rendered images. These errors are particularly noticeable when there is a significant variation in the lighting intensity and distribution in the camera image(s) used to generate the texture data, and/or when the object has regions of highlights or self-shadows.

To address this problem, so-called "view-dependent texture mapping" has been proposed. In this technique, the vertices of each polygon in the 3D computer model are mapped into a plurality of camera images recorded from different viewing positions and directions to provide texture data. Accordingly, texture data from a plurality of respective camera images is available for each polygon. The image to be used to provide texture data for a particular virtual image is selected in dependence upon the relationship between the viewing position and direction of the virtual image and the viewing positions and directions of the camera images.

One problem which occurs in conventional view-dependent texture mapping techniques, however, is that it is necessary to store the large amount of data defining each camera image so that it is available when an image is to be rendered. A further problem arises when the data defining the 3D computer model and texture data are to be transferred over a network (such as the Internet) to a remote apparatus for rendering. This is because the texture data includes the data of all camera images and delays can occur in transferring such a large volume of data over a network.

The present invention aims to address at least one of the problems above.

The present invention provides an apparatus and method for compressing view-dependent image data for an object using a 3D computer model of the object and view-independent data for the object. Processing is performed to define the view-dependent data and the view-independent data in a format to permit subtraction of the data. The data is subtracted to generate difference data, and the difference data is encoded.

To define the data in a format for subtraction, one or both of the view-dependent data and the view-independent data may be transformed to a different two-dimensional space.

Preferably, the view-dependent data is transformed to the two-dimensional space of the view-independent data (for example by defining the view-dependent data in a two dimensional texture map) or the view-independent data is transformed to the two-dimensional space of the view-dependent data (for example by rendering an image using the view-independent data as texture map data).

The difference data resulting from the subtraction represents view-dependent lighting effects and surface reflection properties so that the difference values are large only where these view-dependent effects occur (which is a small proportion of all of the values). As a result, many of the values in the difference data are small values or zero so that the difference data is very smooth or entirely flat in many regions. Consequently, the difference data can be readily compressed using common encoding techniques (for example JPEG encoding).

By way of example, it has been found that by encoding view-dependent data in this way, an R, G, B image of 512 by 512 pixels can typically be compressed to 10-20 kbytes of data, compared to 50-70 kbytes when the image data itself is compressed using JPEG encoding.

The present invention also provides an apparatus and method for rendering an image of a 3D computer model of an object, in which difference data representing the difference between view-independent data and view-dependent data is combined with view-dependent data to reverse the differencing process by which the difference data was generated.

To define the data in a format for combination, one or both of the difference data and the view-independent data may be transformed to a different two-dimensional space.

Preferably, both the view-independent data and the difference data are transformed to the two-dimensional space of an image to be rendered (for example by rendering an image from the viewing position and direction of the image to be rendered in two passes, using the view-dependent data as texture data in one pass and the difference data as texture data in the other pass) or the view-independent data is transformed to the two-dimensional space of the difference data (for example by rendering an image using the view-independent data as texture map data).

The difference data may be decoded before it is combined with the view-independent data (for example if the view-independent data is not itself encoded) or decoding may take place after the data has been combined (for example if the view-independent data is also encoded).

The present invention also provides a computer program product, embodied for example as a storage device carrying instructions or a signal carrying instructions, comprising instructions for programming a programmable processing apparatus to become operable to perform a method as set out above or to become configured as an apparatus as set out above.

Embodiments of the invention will now be described, by way of example only, with reference to the accompanying drawings, in like parts are designated by the same reference number, and in which:

FIGS. 1 and 2 schematically show the components of a first embodiment of the invention, together with the notional functional processing units into which the processing apparatus components may be thought of as being configured when programmed by computer program instructions;

Figure 2:
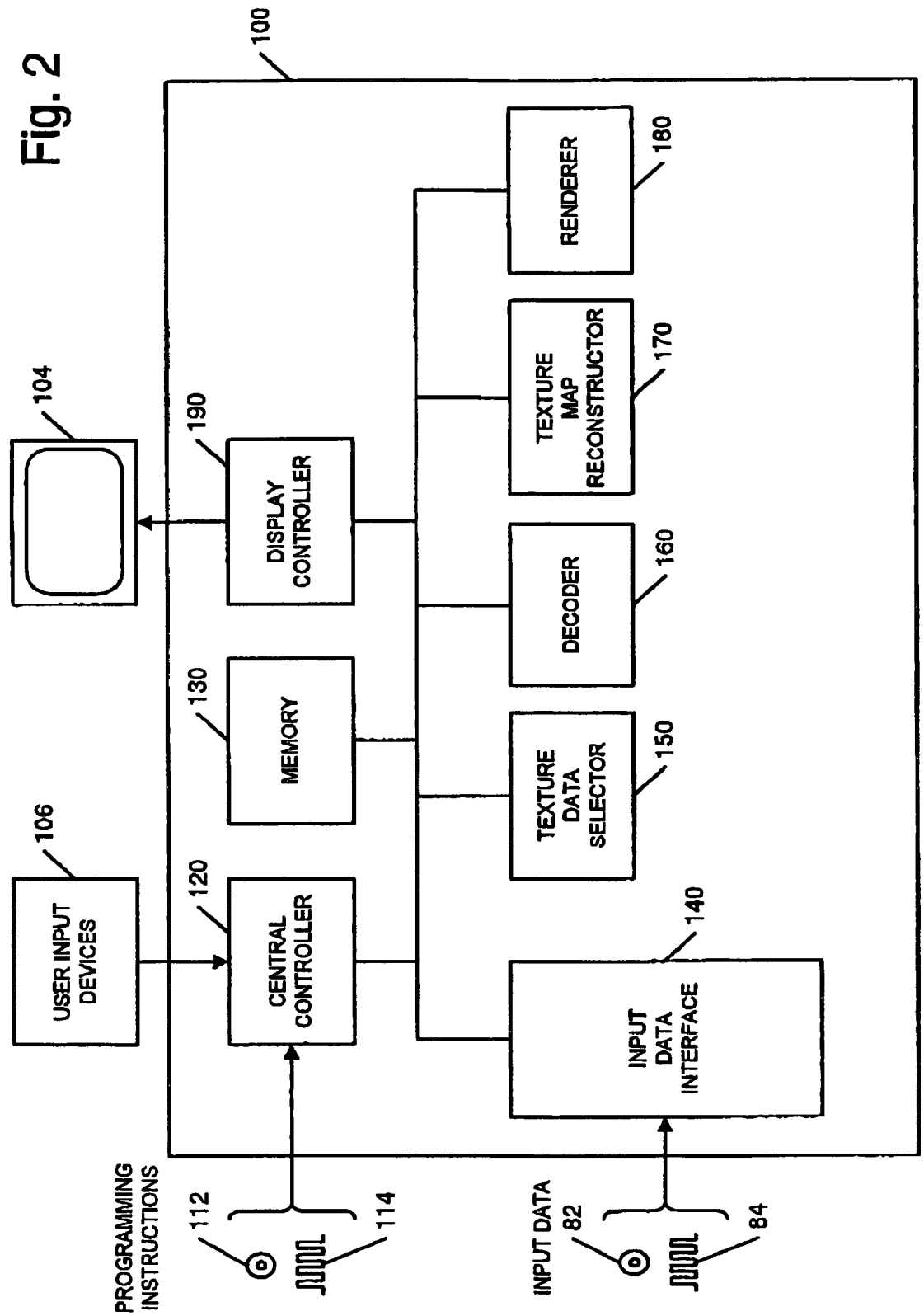
Figure 4:
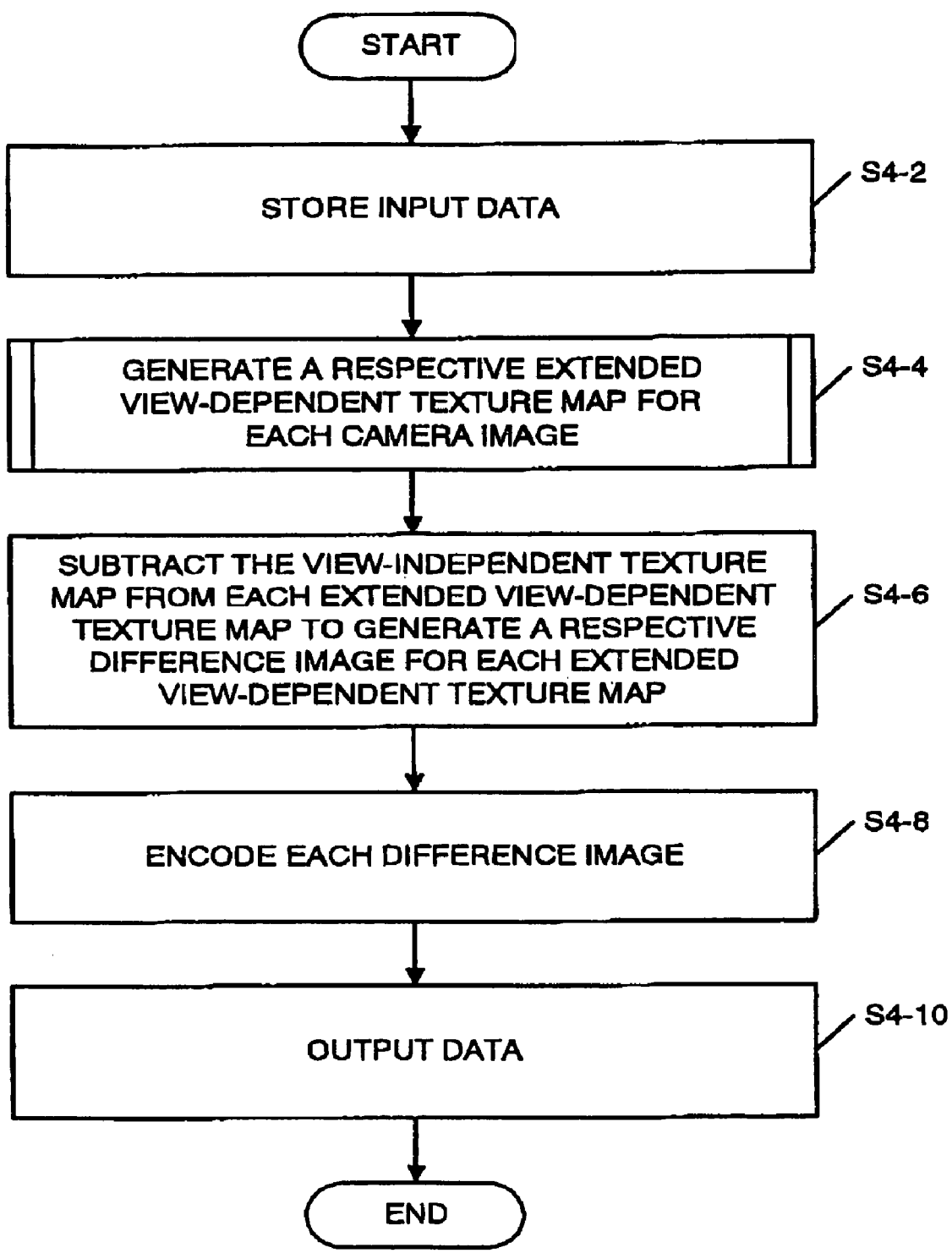
FIG. 4 shows the processing operations performed by the processing apparatus in FIG. 1.
Figure 5A:
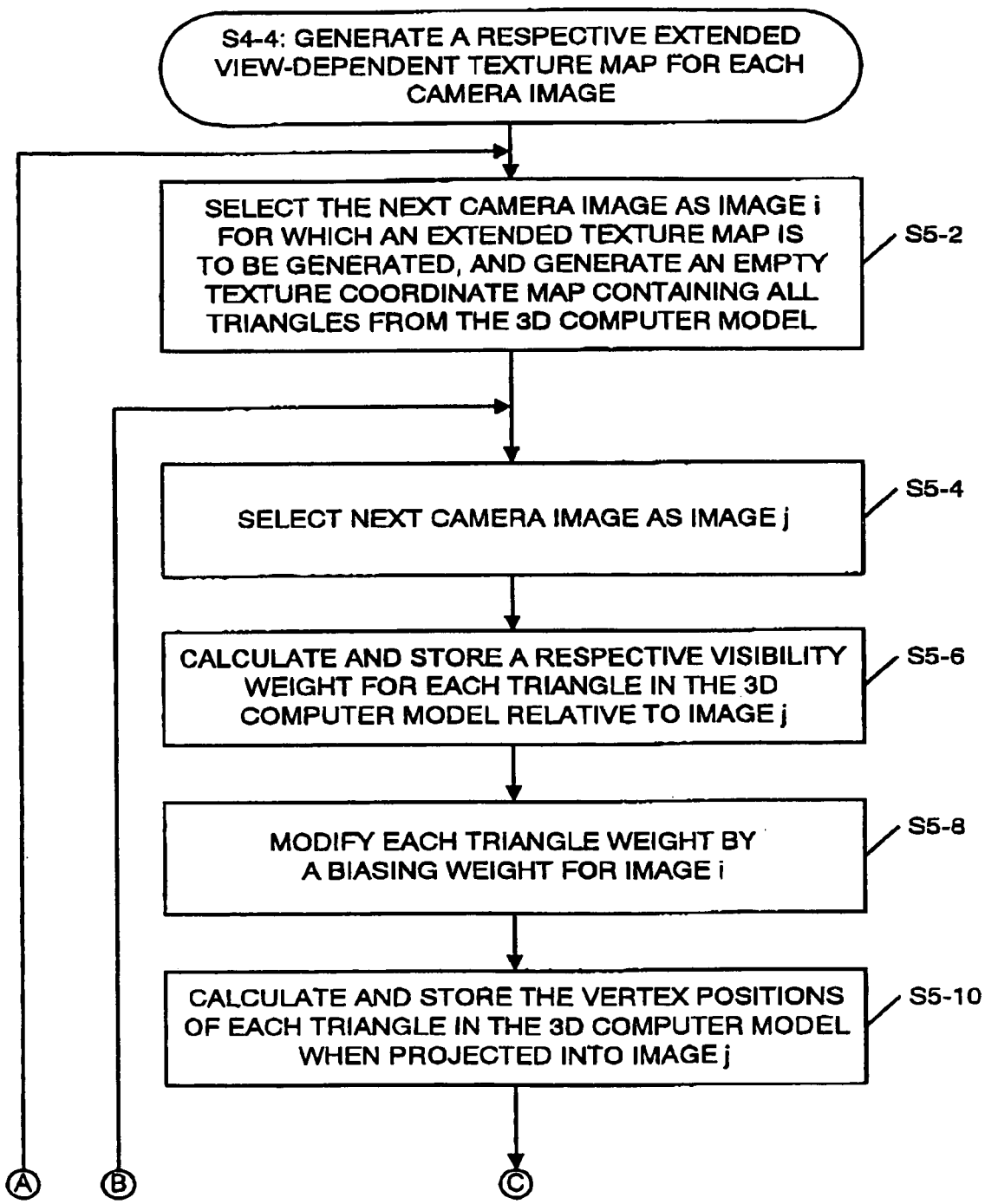
Figure 5B:
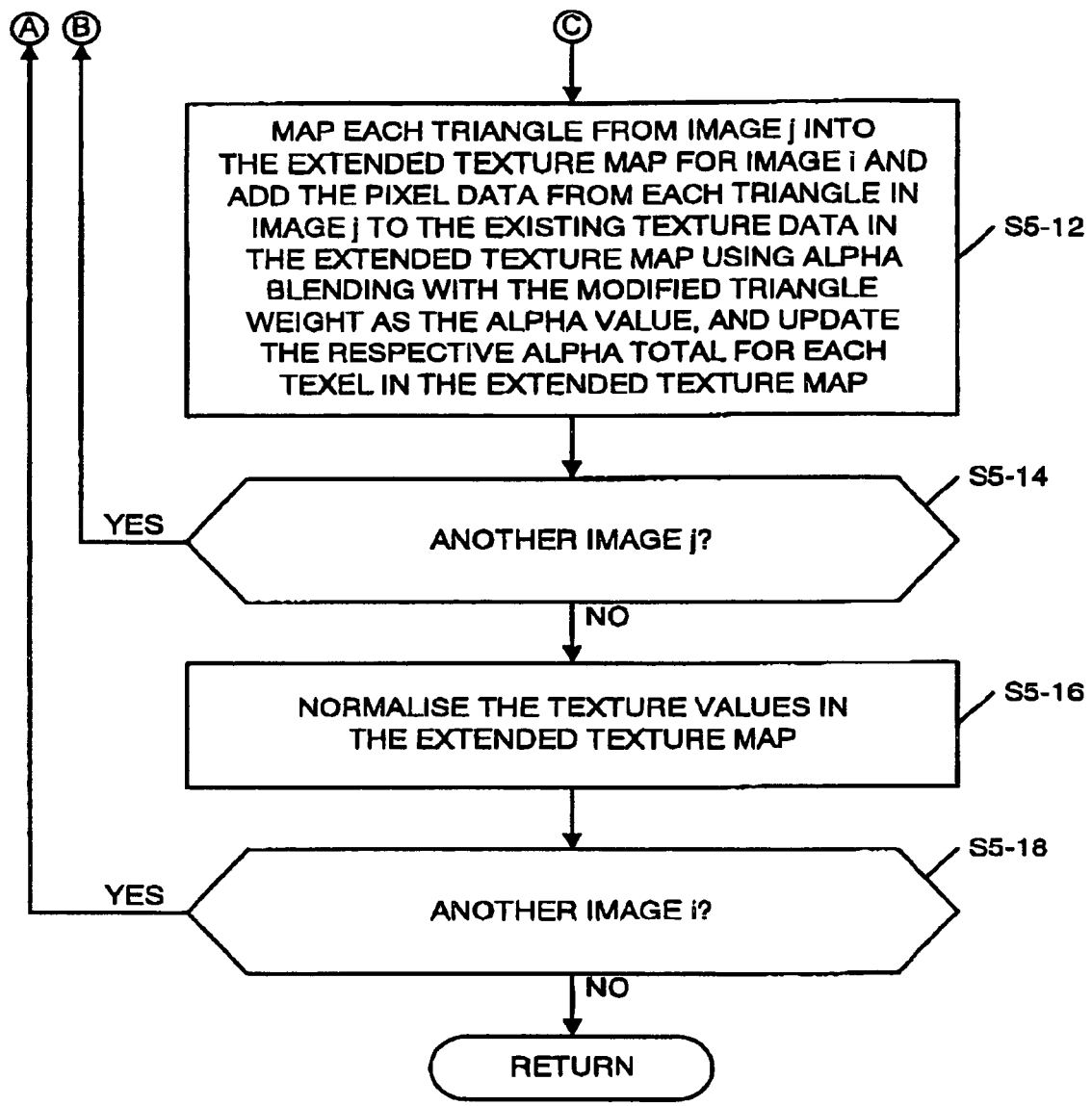
Figure 6A:
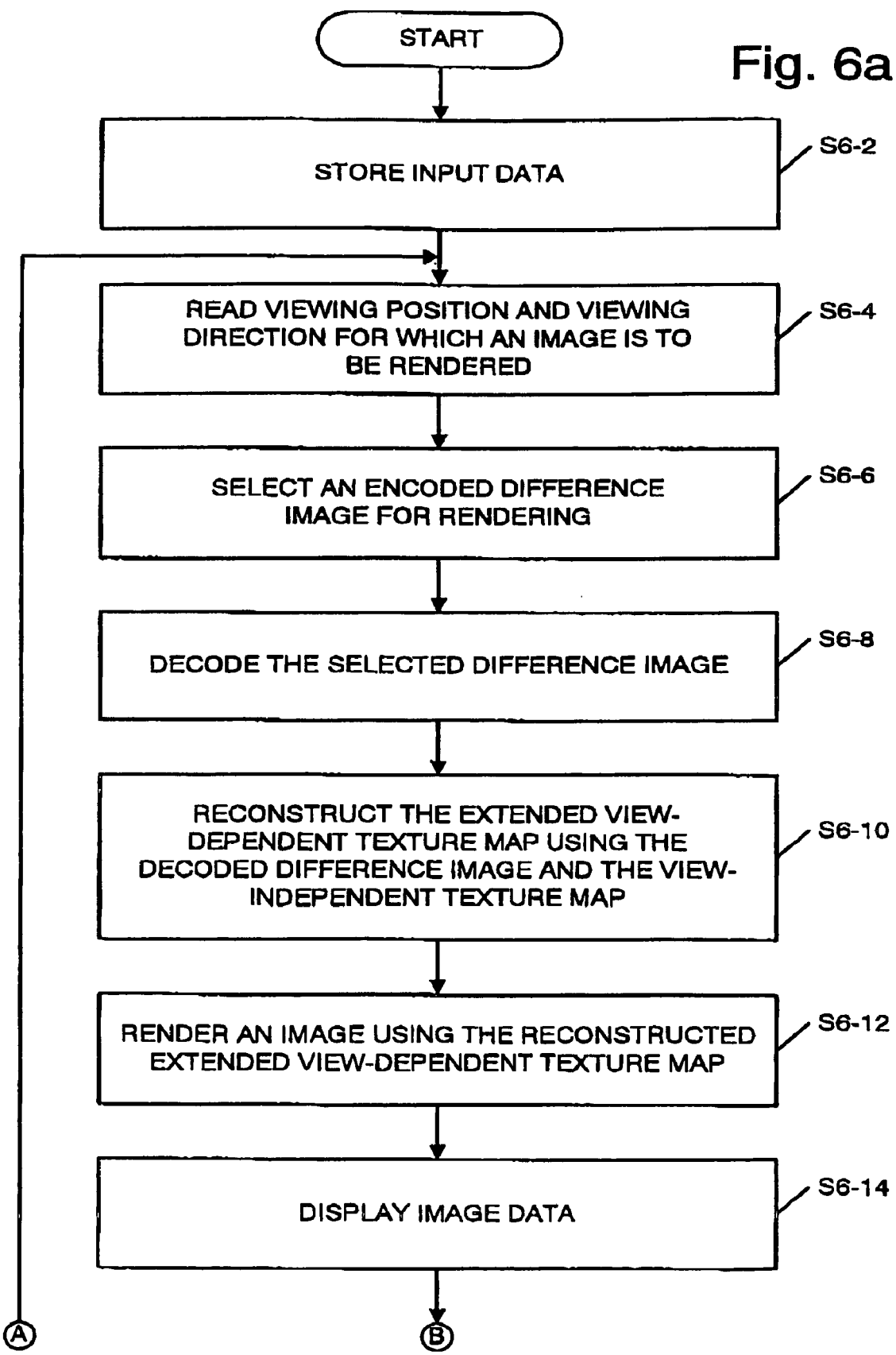
Figure 6B:
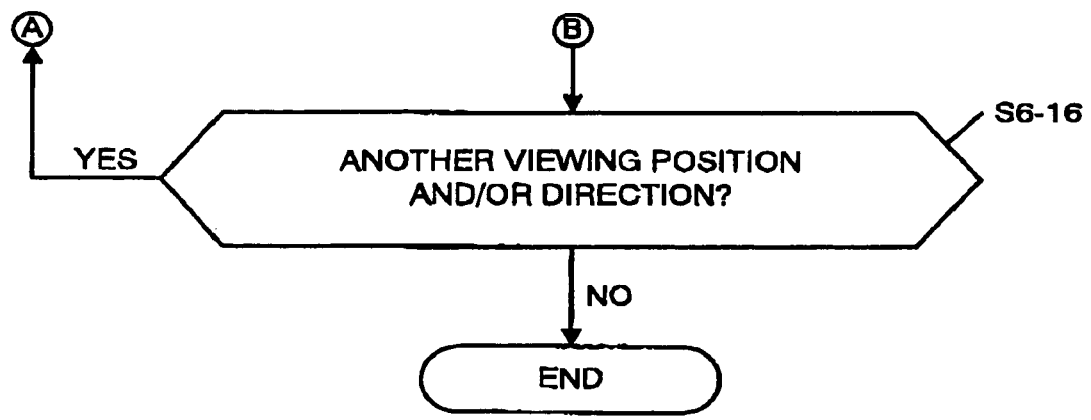
Figure 7:
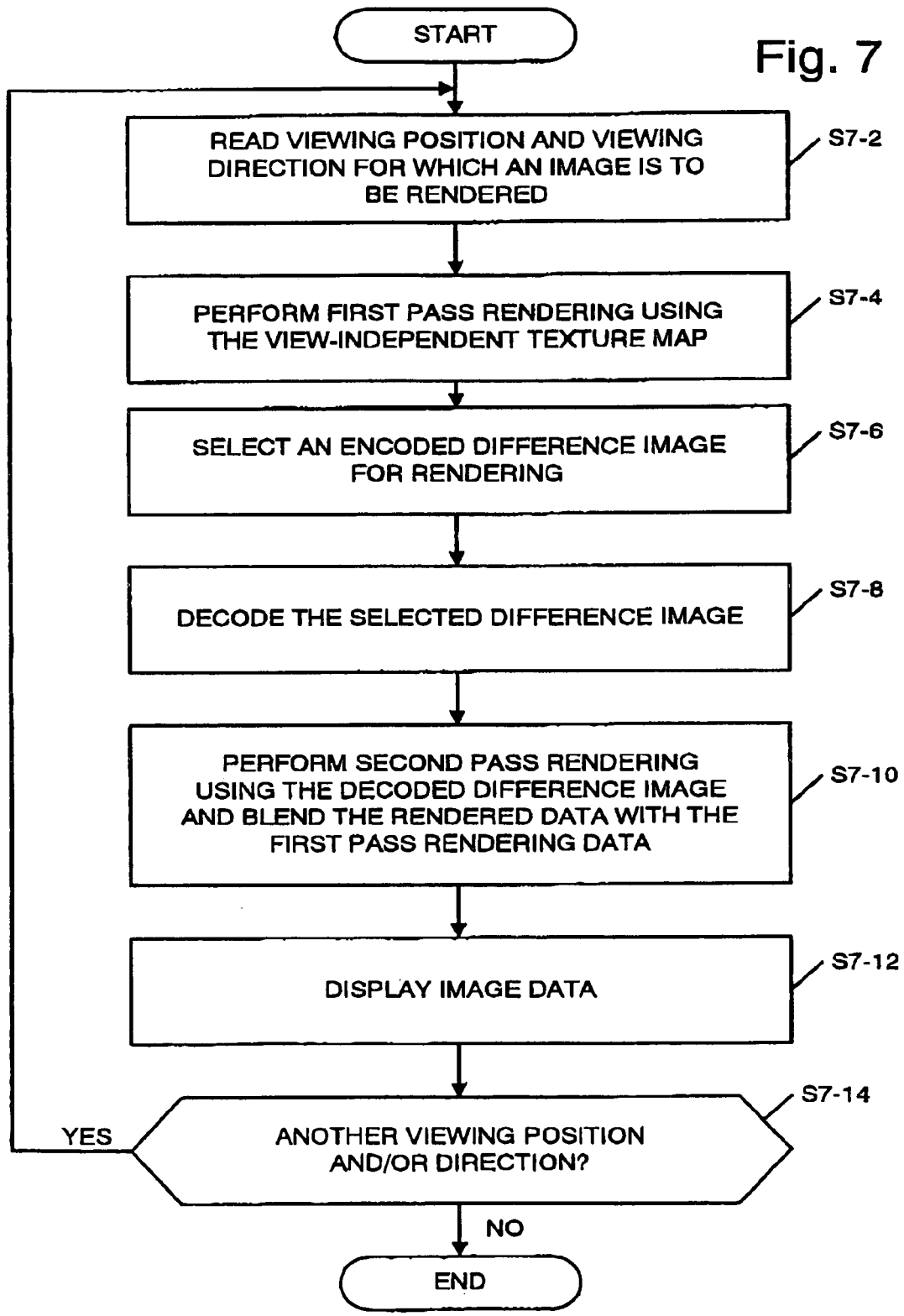
Figure 8:
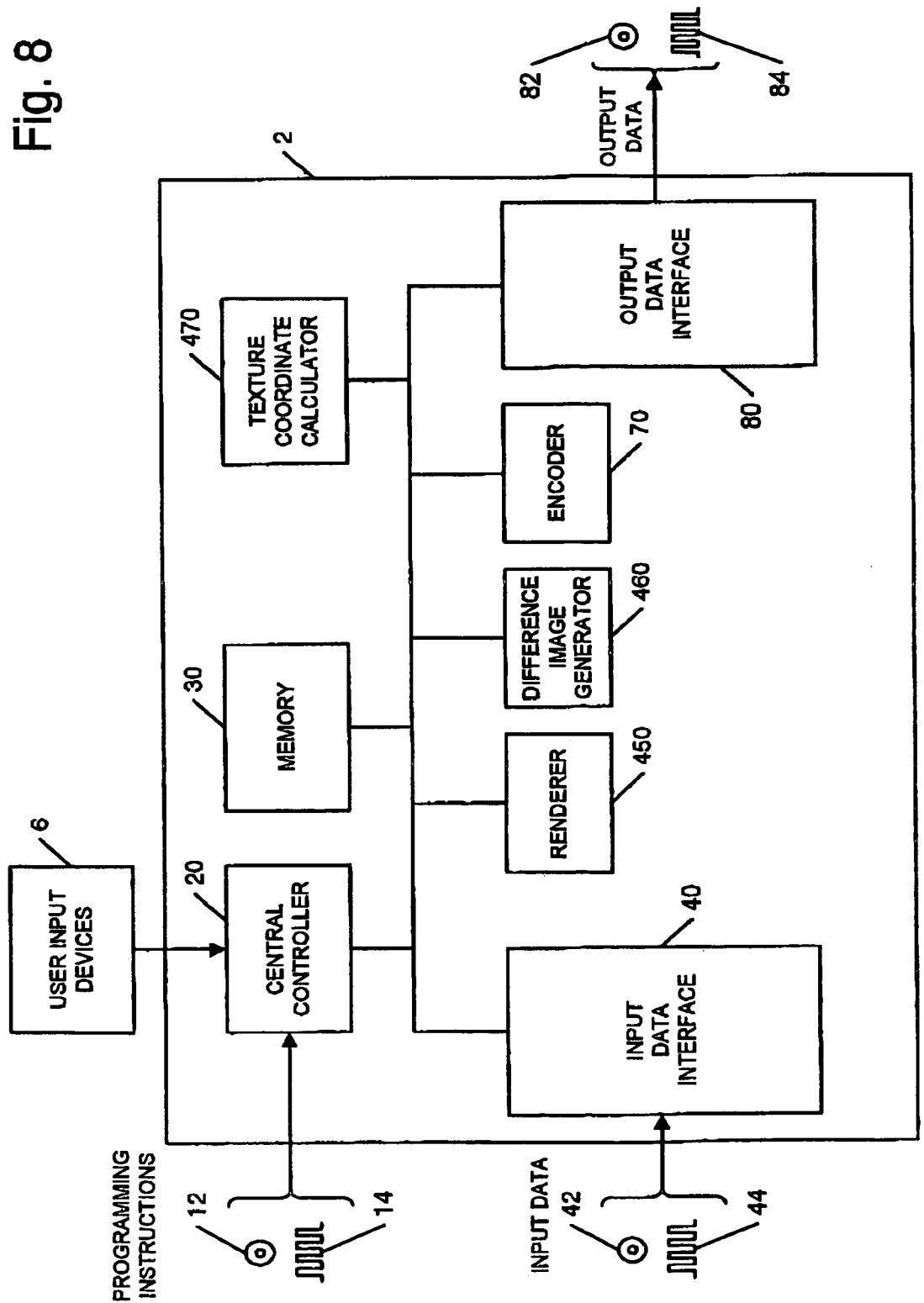
Figure 10A:
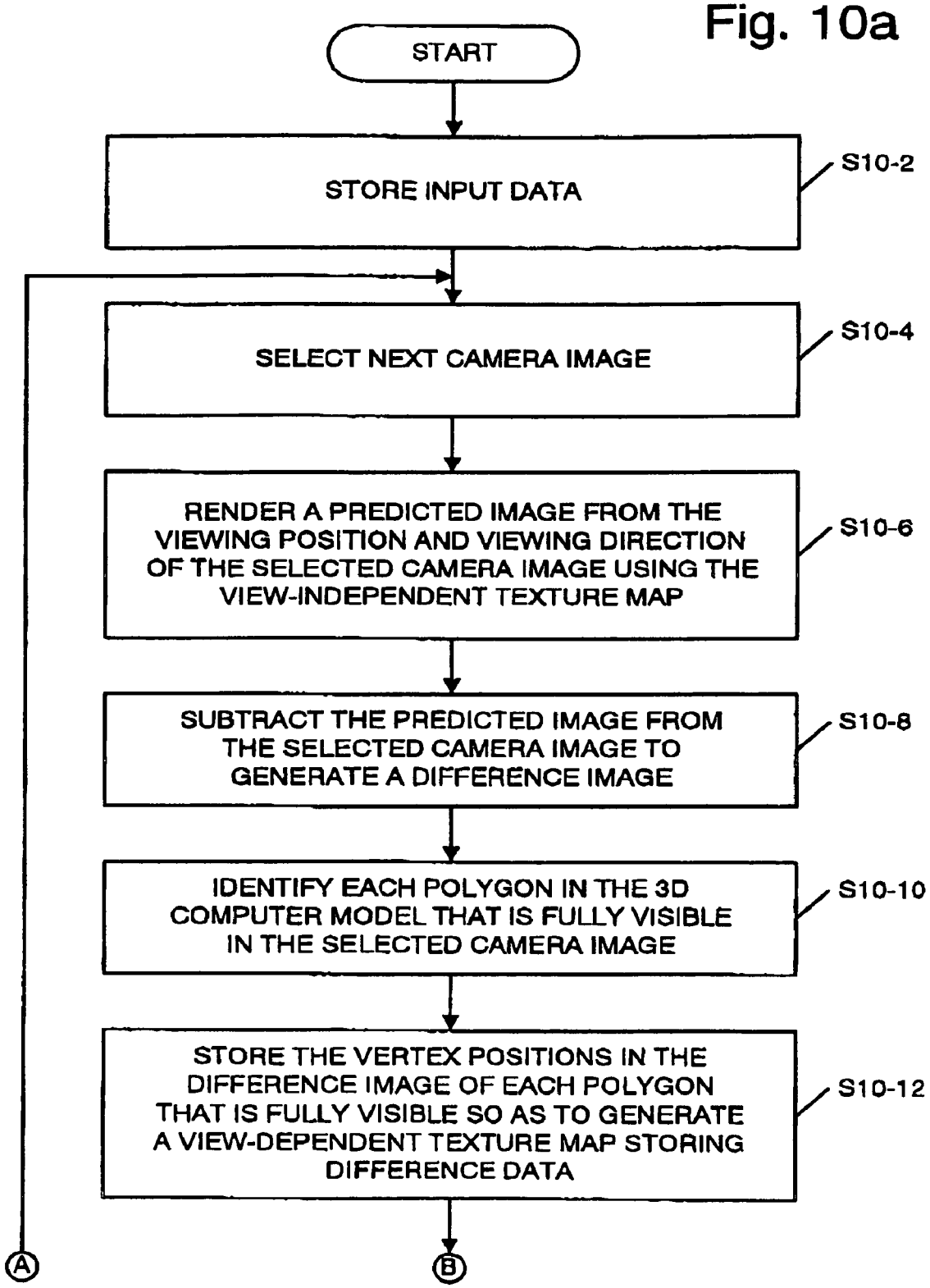
Figure 10B:
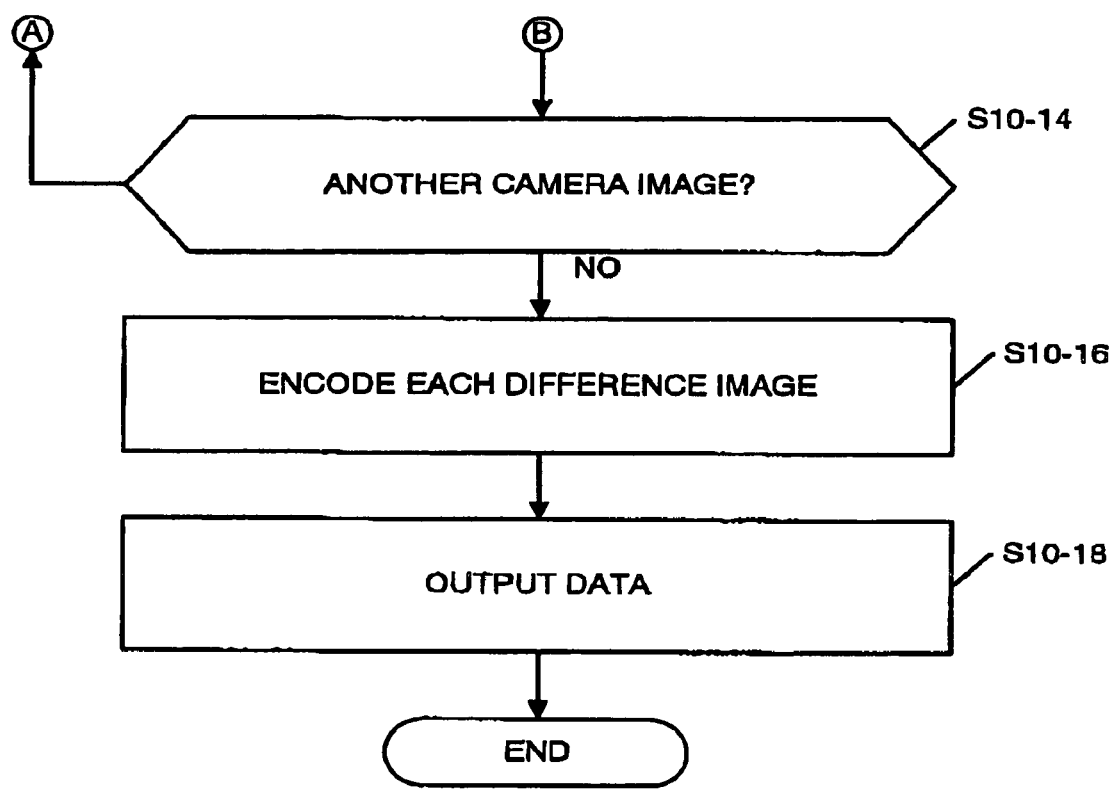
Figure 11A:
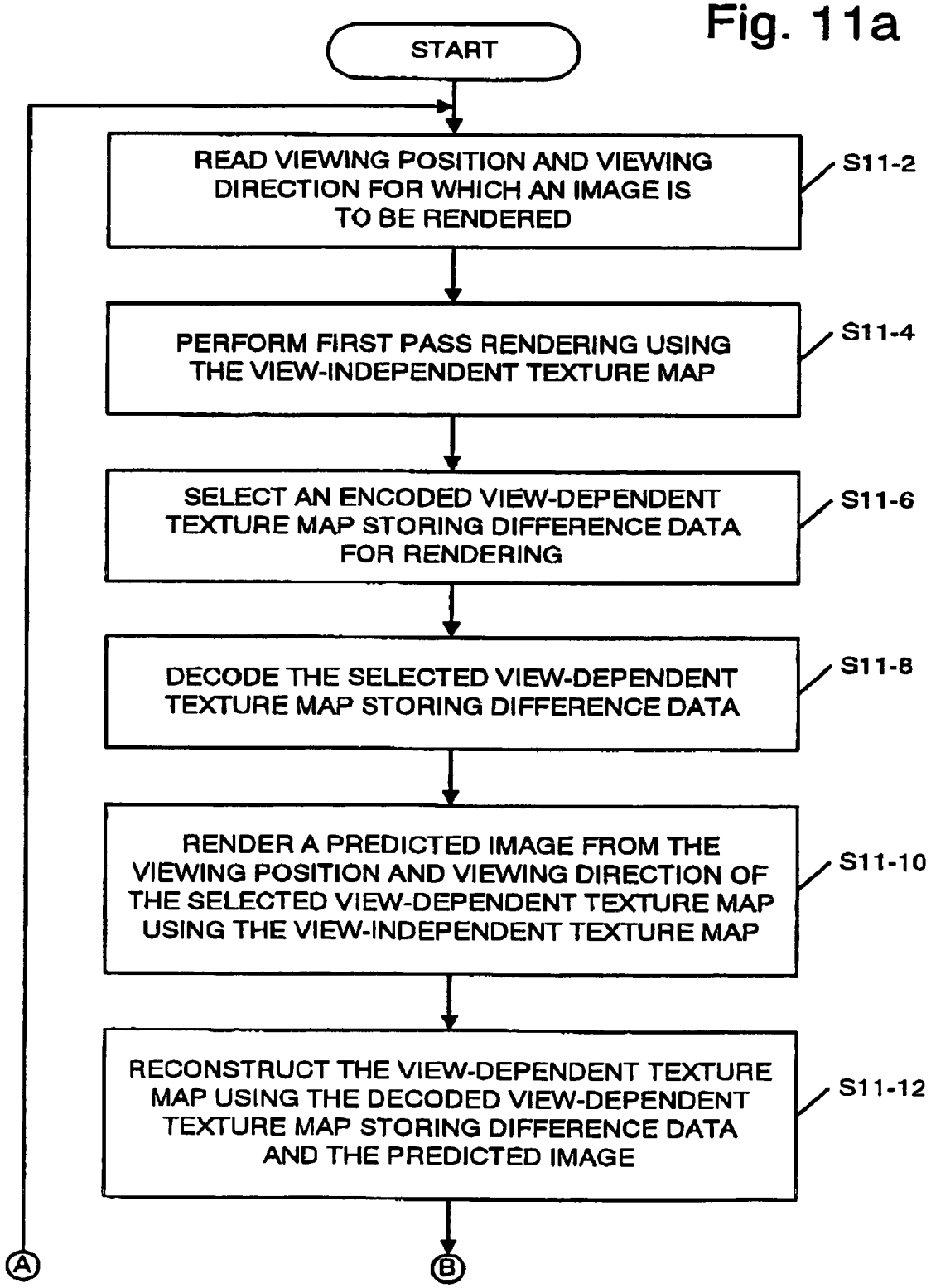
Figure 11B:
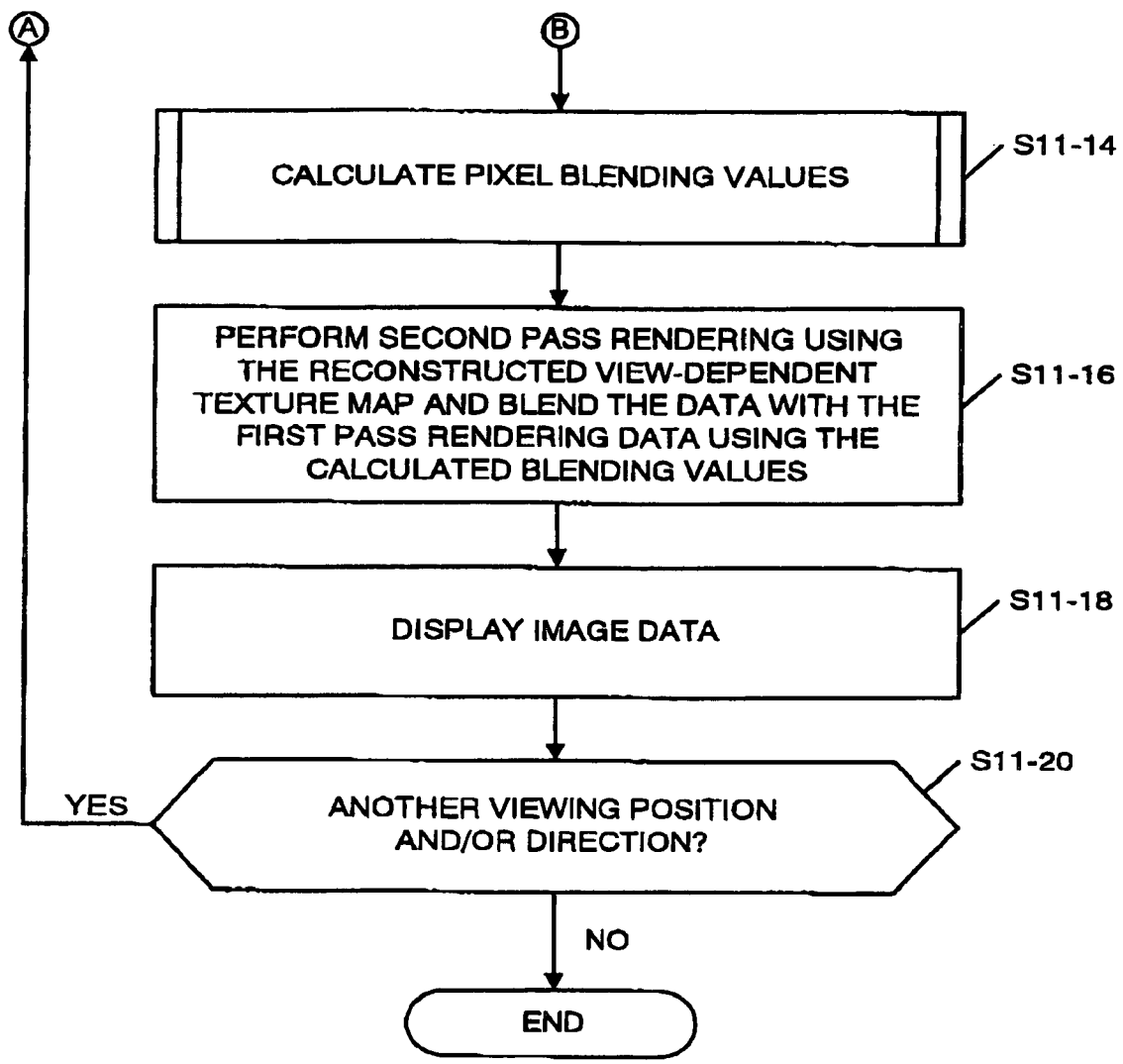
Figure 12:
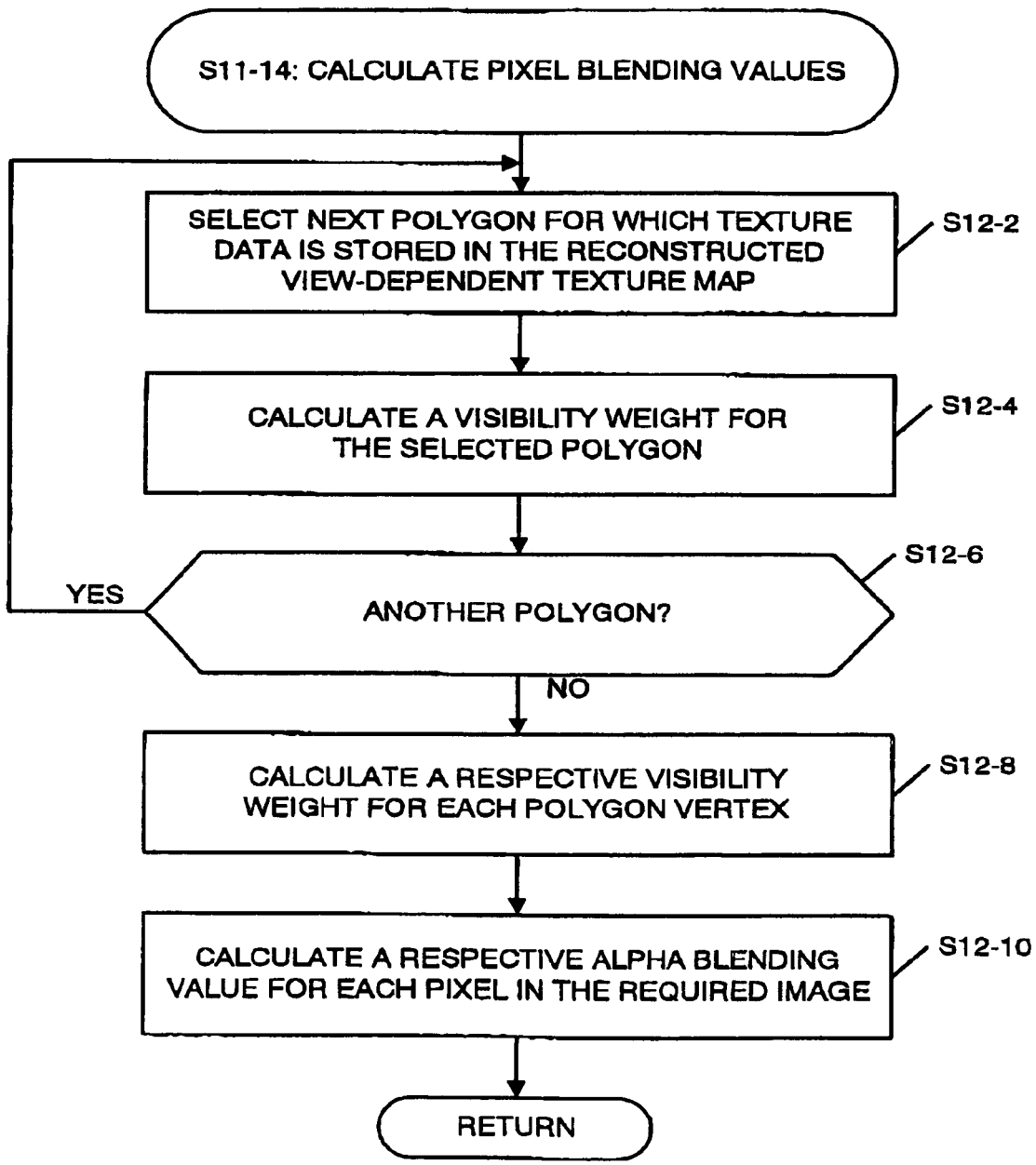
Figure 13:
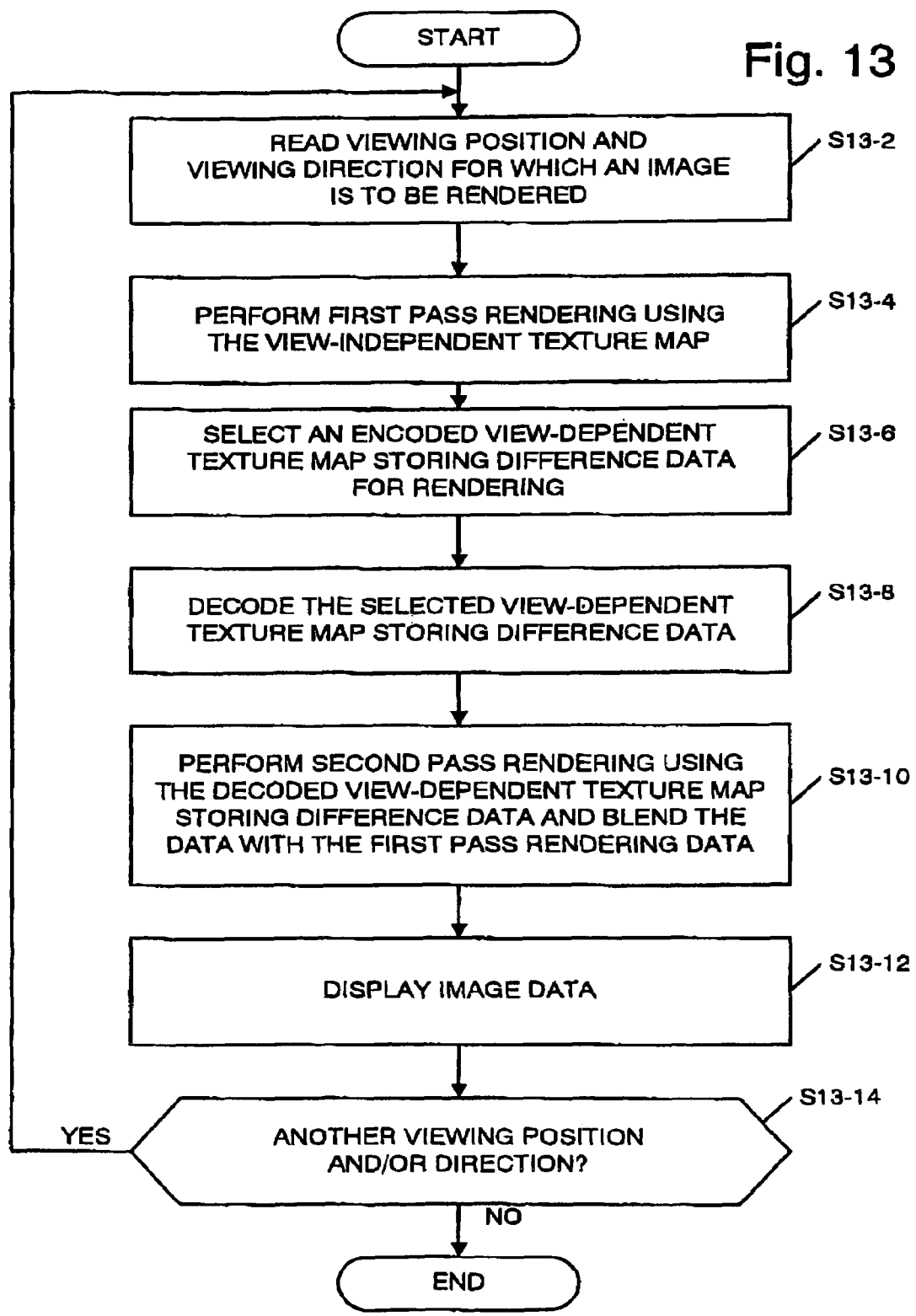
Figure 14A:
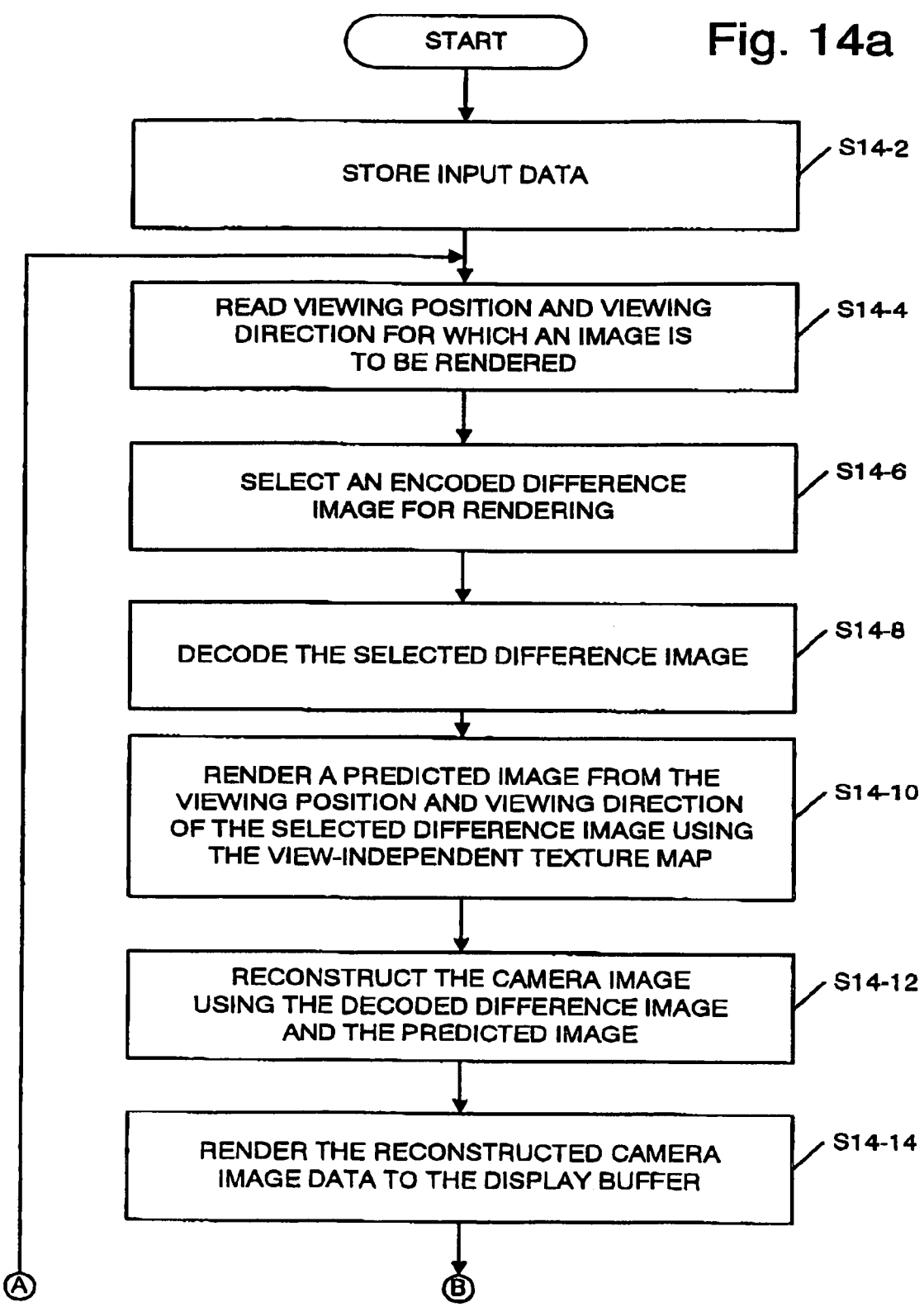
Figure 14B:
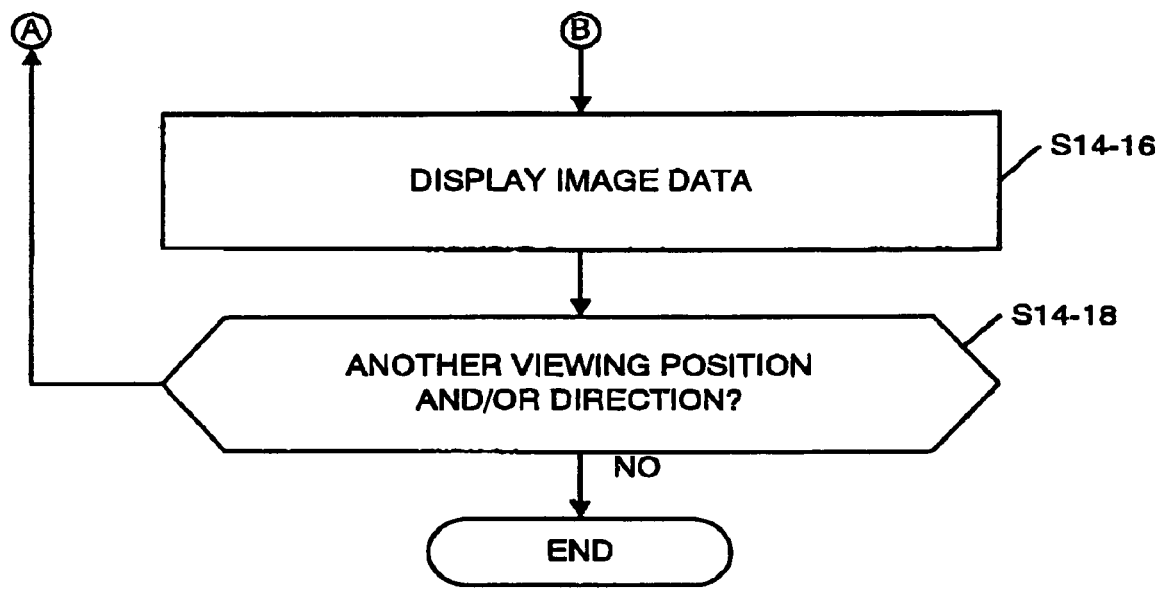

FIG. 5, comprising FIGS. 5a and 5b, shows the processing operations performed at step S4-4 in FIG. 4;

FIG. 6, comprising FIGS. 6a and 6b shows the processing operations of a first rendering technique performed by the processing apparatus in FIG. 2;

FIG. 7 shows the processing operations in a second rendering technique performed by the processing apparatus in FIG. 2;

FIGS. 8 and 9 schematically show the components of a second embodiment of the invention, together with the notional functional processing units into which the processing apparatus components may be thought of as being configured when programmed by computer program instructions;

FIG. 10, comprising FIGS. 10a and 10b, shows the processing operations performed by the processing apparatus in FIG. 8 in the second embodiment;

FIG. 11, comprising FIGS. 11a and 11b, shows the processing operations in a first rendering technique performed by the processing apparatus in FIG. 9;

FIG. 12, shows the processing operations performed at step S11-14 in FIG. 11;

FIG. 13 shows the processing operations in a second rendering technique performed by the processing apparatus in FIG. 9; and FIG. 14, comprising FIGS. 14a and 14b, shows the processing operations in a third rendering technique performed by the processing apparatus in FIG. 9.

FIRST EMBODIMENT

Figure 1:
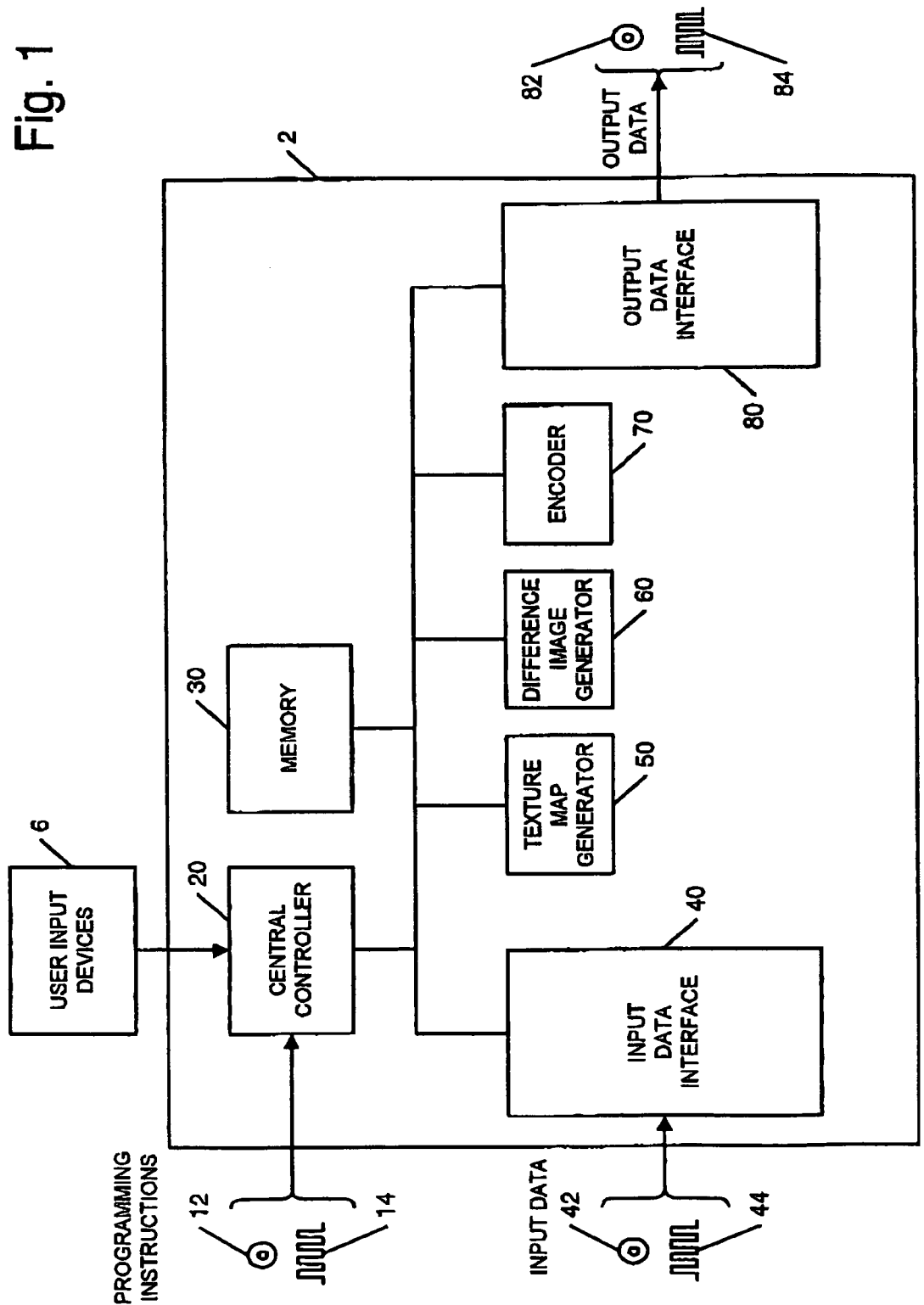

Referring to FIG. 1 and FIG. 2, an embodiment of the invention comprises, firstly, an apparatus 2 operable to compress view-dependent texture images and to output, inter alia, the compressed data and the associated 3D computer model and, secondly, an apparatus 100 operable to receive the data output from apparatus 2 and to render images of the 3D computer model using texture data from the view-dependent texture images.

Processing apparatus 2 and processing apparatus 100 each comprise a program able processing apparatus, such as a personal computer (PC), containing, in a conventional manner, one or more processors, memories, graphics cards etc together with user input devices 6, 106, such as a keyboard, mouse etc. In the case of processing apparatus 100, a display device 104, such as a conventional personal computer monitor, is also provided.

Processing apparatus 2 and processing apparatus 100 are each programmed to operate in accordance with programming instructions input, for example, as data stored on a data storage medium 12, 112 (such as an optical CD ROM, semiconductor ROM, magnetic recording medium, etc), and/or as a signal 14, 114 (for example an electrical or optical signal input to the processing apparatus, for example from a remote database, by transmission over a communication network (not shown) such as the Internet or by transmission through the atmosphere), and/or entered by a user via a user input device such as a keyboard.

As will be described in more detail below, the programming instructions input to processing apparatus 2 comprise instructions to program processing apparatus 2 to become configured to compress a plurality of camera images defining view-dependent texture data for a 3D computer model using the 3D computer model and a view-independent texture map to effect the compression. More particularly, each camera image is converted into an extended view-dependent texture map having the same dimensions and number of texels as the view-independent texture map and storing texture data for every polygon in the 3D computer model at the same coordinates within the view-dependent texture map as those in the view-independent texture map. As a result, the image data from each camera image is transformed to the 2D image space of the view-independent texture map. The view-independent map data is then subtracted texel-by-texel from the data in each extended view-dependent texture map to generate a respective difference image for each camera image. The resulting pixel values in each difference image represent the difference in the camera image data and the view-independent texture data arising from view-dependent lighting effects and surface reflection properties. This difference tends to be very small for many pixels in the difference image, and to be large only for a small number of pixels. As a result, the difference image contains many pixel values of zero and many small pixel values, and can therefore be efficiently compressed using an encoding technique such as JPEG encoding. The data output from processing apparatus 2 comprises data defining the 3D computer model, the view-independent texture map and each encoded difference image, together with data defining the respective viewing direction associated with each difference image (that is the viewing direction of the original camera image from which the difference image was generated).

The programming instructions input to processing apparatus 100 comprise instructions to program processing apparatus 100 to become configured to receive the data output by processing apparatus 2, and to render images of the 3D computer model from different viewing positions and directions using view-dependent texture data from the camera images. To perform the rendering, an encoded difference image is selected and decoded, and the difference image data is combined with (in this embodiment, added to) the view-independent texture data from the view-independent texture map in a common 2D image space to reverse the subtraction process by which the difference image was generated in processing apparatus 2. In its simplest form, because each decoded difference image has the form of an extended texture map with the same dimensions, number of texels and polygon vertex coordinates as the view-independent texture map, the decoded difference image and view-independent texture map are already in the same 2D image space. Therefore, addition of the data can be performed on a texel-by-texel basis. However, as will be explained later, both the difference image data and the view-independent texture data may be transformed to the 2D image space of the image to be rendered for addition.

When programmed by the programming instructions, processing apparatus 2 and processing apparatus 100 can be thought of as being configured as a number of functional units for performing processing operations.

Examples of such functional units and their interconnections are shown in FIGS. 1 and 2. The units and interconnections illustrated in FIGS. 1 and 2 are, however, notional, and are shown for illustration purposes only to assist understanding; they do not necessarily represent units and connections into which the processor, memory etc of the processing apparatus 2 and processing apparatus 100 actually become configured.

Referring to the functional units shown in FIG. 1, central controller 20 is operable to process inputs from the user input devices 6, and also to provide control and processing for the other functional units.

Memory 30 is provided for use by central controller 20 and the other functional units.

Input data interface 40 is operable to control the storage of input data within processing apparatus 2. The data may be input to processing apparatus 2 for example as data stored on a storage medium 42, as a signal 44 transmitted to processing apparatus 2, or using a user input device 6.

In this embodiment, the input data comprises data defining a plurality of camera images of a subject object recorded at different relative positions and orientations, data defining a 3D computer model of the surface of the subject object, data defining the relative 3D positions and orientations of the camera images and the 3D computer surface model, and data defining a view-dependent texture map storing texture data for each polygon of the 3D computer model. In addition, in this embodiment, the input data also includes data defining the intrinsic parameters of each camera which recorded an image, that is, the aspect ratio, focal length, principal point (the point at which the optical axis intersects the imaging plane), first order radial distortion coefficient, and skew angle (the angle between the axes of the pixel grid; because the axes may not be exactly orthogonal).

Figure 3:
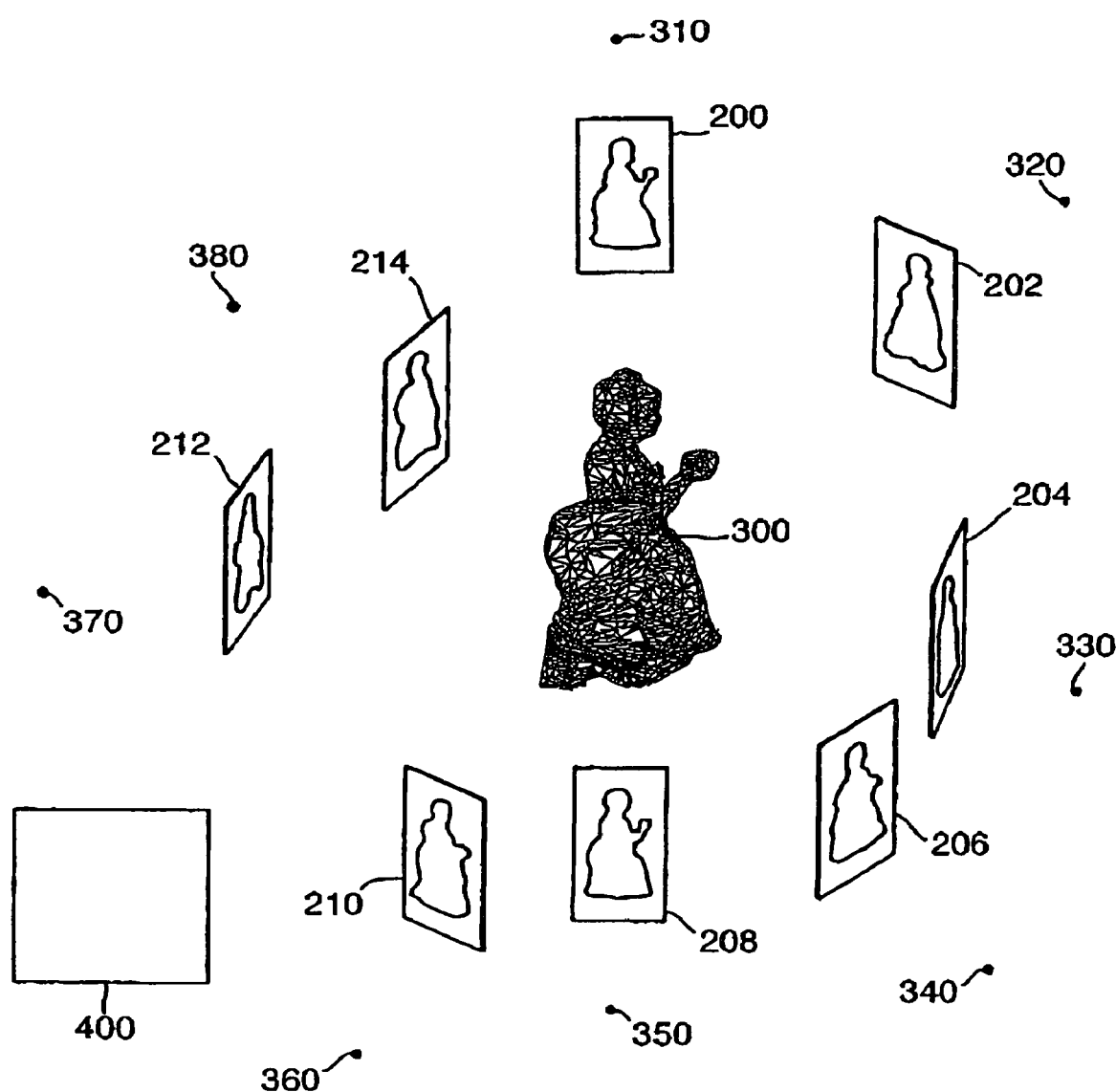
FIG. 3 shows an example to illustrate the data input in the first embodiment to the processing apparatus in FIG. 1.

Thus, referring to FIG. 3, the input data defines a plurality of camera images 200-214 and a 3D computer surface model 300 having positions and orientations defined in 3D space. In this embodiment, the 3D computer surface model 300 comprises a mesh of connected polygons, with each polygon in this embodiment being a triangle, although different types of 3D computer models may be processed. In addition, the input data defines the intrinsic and extrinsic imaging parameters of the camera images 200-214, which defines, inter alia, the respective focal point position 310-380 in 3D space of each image.

The input data also defines a view-dependent texture map 400 storing texture data for every polygon in the 3D computer model.

The input data defining the camera images 200-214 of the subject object, the data defining the 3D computer surface model 300, and the data defining the positions and orientations of the images and 3D computer surface model may be generated in any of a number of different ways. For example, processing may be performed as described in WO-A-01/39124 or EP-A-1,267,309.

The input data defining the view-dependent texture map 400 may also be generated in any of a number of different ways, and the texture data may comprise synthetic texture data and/or texture data from camera images. For example, the texture data may be generated from the input camera images 200-214 as described in co-pending EPC application EP-A-1,204,073 and co-pending US application 2002-0085748-A1.

The input data defining the intrinsic camera parameters may be input, for example, by a user using a user-input device 6.

Referring again to FIG. 1, texture map generator 50 is operable to process the input data to generate a plurality of extended view-dependent texture maps comprising a respective extended texture map for each camera image. Each extended texture map stores texture data not only for the polygons in the 3D computer model 300 that are visible from the viewing position and direction of the corresponding camera image, but also texture data for all other polygons. In addition, each extended texture map has the same number of texels in the length and width directions as the view-independent texture map 400, and each extended texture map stores texture data for each polygon such that the vertices of each polygon map to the same texel positions as those in the view-independent texture map 400.

Difference image generator 60 is operable to perform texel-by-texel subtraction of the red (R), green (G) and blue (B) values in the view-independent texture map 400 from each view-dependent texture map generated by texture map generator 50. In addition, difference image generator 60 is operable to clip the resulting difference values to ensure that they lie within an allowable range of values.

Encoder 70 is operable to encode the difference image generated by difference image generator 60. In this embodiment, encoder 70 is operable to perform JPEG encoding, but other forms of encoding may be performed that efficiently compress images containing a high percentage of pixels having a zero or relatively small image value, such as run-length encoding.

Output data interface 80 is operable to control the output of data from processing apparatus 2. In this embodiment, the output data defines the 3D computer surface model 300, the view-independent texture map 460 and each encoded difference image generated by encoder 70, together with data defining the respective viewing direction for each difference image (that is the viewing direction of the corresponding camera image). Output data interface 80 is operable to output the data for example as data on a storage medium 82 (such as an optical CD-ROM, semiconductor ROM, magnetic recording medium, etc), and/or as a signal 84 (for example an electrical or optical signal transmitted over a communication network such as the Internet or through the atmosphere). A recording of the output data may be made by recording the output signal 84 either directly or indirectly (for example by making a first recording as a "master" and then making a subsequent recording from the master or from a descendent recording thereof) using a recording apparatus (not shown).

Referring to the functional units shown in FIG. 2, central controller 120 is operable to process inputs from the user input devices 6, and also to provide control and processing for the other functional units.

Memory 130 is provided for use by central controller 20 and the other functional units.

Input data interface 140 is operable to control the storage of input data within processing apparatus 100. The input data comprises the output data from processing apparatus 2 (described above) and is input to processing apparatus 100 on storage medium 82 and/or as signal 84.

Texture data selector 150 is operable to select an input encoded difference image for use in rendering in accordance with the viewing direction from which a virtual Image of the 3D computer model 300 is to be rendered.

Decoder 160 is operable to decode the encoded difference images.

Texture map reconstructor 170 is operable to reconstruct an extended view-dependent texture map by adding the texel values of a decoded difference image to the corresponding texel values of the view-independent texture map 400. Accordingly, texture map reconstructor 170 performs the data addition in the 2D image space of the view-independent texture map 400.

Renderer 180 is operable to render a virtual image of the 3D computer surface model 300 using the extended view-dependent texture map reconstructed by texture map reconstructor 170.

Display controller 190, under the control of central controller 120, is operable to control display device 104 to display image data generated by renderer 180.

FIG. 4 shows the processing operations performed by processing apparatus 2 in this embodiment.

Referring to FIG. 4, at step S4-2, input data as described above, is stored in memory 30.

At step S4-4, texture map generator 50 performs processing to transform the image data of each camera image 200-214 into the 2D image space of the view-independent texture map 400. More particularly, texture map generator 50 processes the input data to generate a respective extended view-dependent texture map for each camera image 200-214 in the input data.

FIG. 5 shows the processing operations performed by texture map generator 50 at step S4-4.

Referring to FIG. 5, at step S5-2, texture map generator 50 selects the next camera image 200-214 as image "i" for which an extended texture map is to be generated, and generates an empty texture coordinate map comprising a two-dimensional (2D) rectangle of texels in which is defined a respective triangle for each triangle in the 3D computer model 300. Each triangle in the texture coordinate map will subsequently store texture data for the corresponding triangle in the 3D computer model 300. The term "texture coordinate map" is used because coordinates for the vertices of each respective triangle in the 3D computer model 300 are stored therein.

The processing to generate each texture coordinate map at step S4-2 comprises generating a copy of the view-independent texture map 400 but without the texture data stored therein. In this way, each texture coordinate map has the same number of texels in the length and width directions as the view-independent texture map 400, and the coordinates of the triangle vertices are the same as those in the view-independent map 400.

At step S5-4, texture map generator 50 selects the next camera image stored at step S4-2 as image "j". It should be noted that every camera image stored at step S4-2 is available for selection at step S5-4 and accordingly, on one iteration, image j will be the same as image i selected at step S5-2.

At step S5-6, texture map generator 50 calculates and stores a respective visibility weight for each triangle in the 3D computer model 300 in dependence upon the orientation of the triangle relative to image j selected at step S5-4. More particularly, to calculate each respective weight in this embodiment, texture map generator 50 calculates the dot product of the triangle normal vector (that is, a vector perpendicular to the plane of the triangle) with the vector defining the viewing direction of the camera for image j. The resulting value is then stored as the weight for the triangle, unless the value is negative, in which case a weight of zero is stored for the triangle. A weight is calculated in this way for each triangle in the 3D computer model 300. Each weight calculated at step S5-6 is therefore a measure of the visibility of the corresponding triangle in image j (ignoring occlusions).

At step S5-8, texture map generator 50 modifies each triangle weight calculated at step S5-6 by a biasing weight to ensure that image data from image i contributes more to the texture data in the extended texture map for image i than image data from any other respective image. More particularly, texture map generator 50 modifies each triangle weight by a measure of the similarity of the view of the 3D computer model 300 available in image i and the view of the 3D computer model 300 available in image j.

To modify a triangle weight in this embodiment, texture map generator 50 multiplies the weight by the value 1.0 if image i is the same as image j, and multiplies the triangle weight by the value 0.1 if image i is not the same as image j. The triangle weights may be modified in other ways, however. For example, each triangle weight may be modified in dependence upon the relative viewing directions of image i and image j by multiplying each triangle weight by the value resulting from the dot product of the viewing direction of image i and the viewing direction of image j. In addition, each triangle weight may be modified in dependence upon the relative viewing positions of image i and image j by dividing each triangle weight by the distance between the viewing position of image i and the viewing position of image j.

As a result of the modification at step S5-8, the triangle weights are biased to have a relatively high value if image i is equal to image j (or if the viewing direction of image i is close to the viewing direction of image j if modification using the dot product of the viewing directions is used as described above).

At step S5-10, texture map generator 50 calculates and stores the vertex positions of each triangle in the 3D computer model 300 when projected into image J. In this embodiment, the processing at step S5-10 is performed using Open GL perspective projection to project the triangles from the 3D computer model into the 2D image j.

At step S5-12, texture map generator 50 maps each triangle defined by the vertex projections at step S5-10 from image j into the texture coordinate map for image i generated at step S5-2. In addition, texture map generator 50 adds the pixel data from each triangle in image j to the existing texture data for the texels in the texture coordinate map onto which the triangle maps. The addition of the pixel data from image j to the existing texture data in the extended texture map is performed using α blending with the modified triangle weight calculated at step S5-8 being used as the α value. This processing is performed in this embodiment using Open GL texture mapping and Open GL α blending.

As a result of the processing at step S5-12, the red (R), green (G) and blue (B) texture data stored for a texel in the extended texture map is given by:

$$R = R_T + \alpha R_j \quad (1)$$

$$G = G_T + \alpha G_j \quad (2)$$

$$B = B_T + \alpha B_j \quad (3)$$

where $R_T$, $G_T$, $B_T$ are the R, G, B values stored in the texture coordinate map before the addition of data from the currently selected image j;

α is the modified a value calculated at step S5-8 for the triangle in which the pixel in image j lies;

$R_j$, $G_j$, $B_j$ are the R, G, B values of the pixel data in image j.

Texture map generator 50 maintains a respective α value total for each texel in the extended texture map, and this total is updated at step S5-12 by adding any α value used to update the texture data for that texel.

At step S5-14, texture map generator 50 determines whether every camera image stored at step S4-2 has been processed as image j. Steps S5-4 to S5-14 are repeated until every camera image has been processed as image j.

At step S5-16, texture map generator 50 normalises the texture values stored in the extended texture map. More particularly, for each texel in the extended texture map, texture map generator 50 divides the respective R, G and B values by the α value total for that texel.

At step S5-18, texture map generator 50 determines whether every camera image stored at step S4-2 has been processed as image i. Steps S5-2 to S5-18 are repeated until every camera image has been processed as image i.

As a result of this processing, a respective extended view-dependent texture map is generated for each camera image stored at step S4-2. Consequently, each input camera image 200-214 has been transformed to a 2D image space which is the same as the 2D image space of the view-independent texture map 400 (because each extended view-dependent texture map has the same dimensions, number of texels and polygon vertex coordinates as those of the view-independent texture map 400).

Referring again to FIG. 4, at step S4-6, difference image generator 60 subtracts R, G, B the texture values in the view-independent texture map 400 from the R, G, B texture values in each extended view-dependent texture map generated at step S4-4 on a texel-by-texel basis. As a result, a respective difference image is generated for each extended view-independent texture map. In this embodiment, each texel subtraction is performed in accordance with the following equations;

$$D_R = 128 + T_R - R_o \quad (4)$$

$$D_G = 128 + T_G - G_o \quad (5)$$

$$D_B = 128 + T_B - B_o \quad (6)$$

Subsequent clipping of the resulting values is then performed in accordance with:

$$\text{If } D < 0, \text{ then set } D = 0 \quad (7)$$

$$\text{If } D > 255, \text{ then set } D = 255 \quad (8)$$

where
- $T_R, T_G, T_B$ are the red, green and blue values of the texel in the extended view-dependent texture map (each value lying in the range 0-255);
- $R_o, G_o, B_o$, are the red, green and blue values of the corresponding texel in the view-dependent texture map 400 (each value lying in the range 0-255);
- D is a difference image value (red, green or blue).

The subtraction at step S4-6 has the effect that texture data which is the same in an extended view-dependent texture map as the view-independent texture map 400 is removed, resulting in the R, G and B values for many pixels in the difference image being 0. Any value in a difference image which is not 0 represents the effect of view-dependent lighting and surface reflection properties. Consequently, a large proportion of the pixels in each difference image will have zero or small values, with only a small proportion of pixels will have large values, making each difference image readily compressible.

At step S4-8, therefore, encoder 70 performs compression encoding of each difference image generator at step S4-6. In this embodiment, the compression encoding performed at step S4-8 comprises JPEG encoding, but any other form of encoding which compresses images containing large proportions of pixels having a zero value or a small value may be performed instead, such as run-length encoding.

At step S4-10, output data interface 80 outputs data as data stored on a storage medium 82 and/or as data carried by a signal 84. In this embodiment, the output data defines the 3D computer surface model 300, the view-independent texture map 400, each encoded difference image generated at step S4-8, and the respective viewing direction of each difference image.

FIG. 6 shows the processing operations performed by processing apparatus 100 upon receipt of data output from processing apparatus 2.

Referring to FIG. 6, at step S6-2, input data interface 140 stores input data received on storage medium 82 and/or signal 84 from processing apparatus 2 in memory 130.

At steps S6-4 to S6-16, processing apparatus 100 performs processing to render images of the 3D computer model 300 from viewing positions and directions specified by a user using a user input device 106.

More particularly, at step S6-4, the viewing position and direction for which an image is to be rendered is read.

At step S6-6, texture data selector 150 selects one of the encoded difference images previously generated by processing apparatus 2 and stored at step S6-2 for rendering an image of the 3D computer model 300 from the defined viewing position and direction. More particularly, in this embodiment, texture data selector 150 calculates the respective dot product of the viewing direction read at step S6-4 and the respective viewing direction of each difference image. The difference image for which the dot product value is largest is then selected for rendering.

At step S6-8, decoder 160 decodes the selected difference image using JPEG decoding (or an alternative form of decoding corresponding to the encoding performed in processing apparatus 2 if encoder 70 performed encoding other than JPEG encoding).

At step S6-10, texture map reconsturctor 170 reconstructs an extended view-dependent texture map using the decoded difference image generated at step S6-8 and the view-independent texture map 400 stored at step S6-2. More particularly, texture map reconstructor 170 reconstructs the extended view-dependent texture map by adding the red, green and blue pixel values of the decoded difference image to the corresponding texel values in the view-independent texture map 400 in accordance with the following equations:

$$T_R = R_o + D_R - 128 \quad (9)$$

$$T_G = G_o + D_G - 128 \quad (10)$$

$$T_B = B_o + D_B - 128 \quad (11)$$

Subsequent clipping of the resulting values is then performed in accordance with:

$$\text{If } T < 0, \text{ then set } T = 0 \quad (12)$$

$$\text{If } T > 255, \text{ then set } T = 255 \quad (13)$$

where
- $D_R, D_G, D_B$ are the red, green and blue values of the pixels in the difference image (each value lying in the range 0-255);
- $R_o, G_o, B_o$, are the red, green and blue values of the corresponding texel in the view-dependent texture map 400 (each value lying in the range 0-255);

T is an extended view-dependent texture map value (red, green or blue).

As a result, the pixel values in the decoded difference image are added to the texel values In the view-independent texture map 400 in the same 2D image space as that of the view-independent texture map 400.

At step S6-12, renderer 180 renders an image of the 3D computer model 300 from the viewing position and direction read at step S6-4 using the extended view-dependent texture map reconstructed at step S6-10. This rendering is performed in a conventional way. Because the extended texture map contains texture data for all triangles in the 3D computer model 300, texture data is available for rendering even for triangles that are visible in the rendered image but not in the camera image associated with the extended texture map. Consequently, rendering can be performed in one pass using the texture data from the extended texture map.

It should be noted that the processing at steps S6-4 to S6-12 described above requires only one difference image to be decoded and converted back into an extended texture map to allow rendering to be performed. Consequently, rendering can be performed quickly.

At step S6-14, central controller 120 controls display processor 190 to display the rendered image data generated at step S6-12 on display 104.

At step S6-16, it is determined whether a different viewing position and/or viewing direction has been defined for a further image of the 3D computer model 300.

Steps S6-4 to S6-16 are repeated until images have been rendered and displayed for each required viewing position and direction.

Alternative Rendering Technique in the First Embodiment

A modification of processing apparatus 100 in the first embodiment and the processing operations performed thereby will now be described. The resulting modified embodiment is able to perform rendering more quickly than the embodiment described above, in particular because it does not need to wait for data defining the difference images to be received from processing apparatus 2 before rendering can begin.

By way of overview, in the embodiment described above, the image data of a difference image selected for rendering is added to the texel data of the view-independent texture map 400 in the 2D image space of the view-independent map 400. Consequently, the data defining the selected difference image must have been received from processing apparatus 2 before the addition can take place.

On the other hand, in the modification to be described, the texture data in the view-independent texture map and the difference data in the difference image selected for rendering are rendered into an image from the viewing position and direction defined by the user (that is, of the image to be generated), and the data is added in this common 2D image space.

As a result, rendering using the view-independent texture map 400 can take place before, or at the same time as, data defining the difference images is received from processing apparatus 2 (or rendering using the difference image can take place before, or at the same time as, data defining the viewing-independent texture map 400 is received).

In the modification, the components of processing apparatus 100 and the processing operations performed thereby are the same as those in FIG. 2, with the exception that texture map reconstructor 170 is omitted and renderer 180 is operable to perform two pass rendering with blending as described below.

FIG. 7 shows the processing operations performed by processing apparatus 100 in the modification of the first embodiment.

Referring to FIG. 7, at step S7-2, the viewing position and viewing direction for an image to be rendered are read.

At step S7-4, renderer 180 performs first pass rendering of the image from the read viewing position and direction using the view-independent texture map 400. This rendering is performed in a conventional way and generates texture data for every triangle in the 3D computer model 300 that is visible from the viewing position and direction read at step S7-2.

At steps S7-6 and S7-8, texture data selector 150 selects an encoded difference image for rendering and decoder 160 decodes the selected difference image. The processing at steps S7-6 and S7-8 is the same as the processing at steps S6-6 and S6-8 described above.

The processing at steps S7-6 to S7-8 could be performed in parallel with the processing at step S7-4 if the data defining the difference images is available.

At step S7-10, renderer 180 performs second pass rendering of the image from the viewing position and viewing direction read at step S7-2 using the decoded difference image generated at step S7-8 (the mapping of image data from the decoded difference image being defined by the polygon vertex positions in the difference image previously defined at step S5-2). The rendered data from the second pass is blended with the rendered data from the first pass in accordance with equations (9) to (13) described above.

Consequently, in this modification, the difference image data is added to the view-independent texture map data in the 2D image space of the image to be rendered.

At steps S7-12 and S7-14, the rendered image data is displayed and checks are carried out for further viewing positions and/or viewing directions in the same way as at steps S6-14 and S6-16 described above.

SECOND EMBODIMENT

A second embodiment of the present invention will now be described.

By way of overview, in the first embodiment, each camera image 200-214 is transformed into the 2D image space of the view-independent texture map 400 to enable data subtraction to be performed to generate the difference images.

On the other hand, in the second embodiment, the 3D computer model 300 and a transformation between 3D space and 2D space is used to transform the texture data of the view-independent texture map 400 into the 2D image space of each camera image 200-214 to enable subtraction to take place to generate the difference images.

FIGS. 8 and 9 show the apparatus and functional components of the second embodiment.

Referring to FIG. 8, the data input to processing apparatus 2 is the same as that in the first embodiment. In addition, the components of processing apparatus 2 and the processing apparatus performed thereby in the second embodiment are the same as those in the first embodiment, with the exception that texture map generator 50 is replaced by renderer 450, difference image generator 60 is replaced by difference image generator 460, and texture coordinate calculator 470 is provided.

Renderer 450 is operable to render images using the view-independent texture map 400.

Difference image generator 460 is operable to subtract image data generated by renderer 450 from the image data of a camera image 200-214.

Texture coordinate calculator 470 is operable to calculate coordinates for vertices of polygons from the 3D computer model 300 in each difference image generated by difference image generator 460, thereby generating a texture map storing difference data from each difference image.

Referring to FIG. 9, the inputs and outputs of processing apparatus 100 are the same as those in the first embodiment, with the exception that data defining the viewing position and intrinsic camera parameters is included in the data output from processing apparatus 2 and input to processing apparatus 100. In addition, the functional components and the processing operations performed thereby are the same as those in the first embodiment, with the exception that texture map reconstructor 170 is replaced by texture map reconstructor 490, renderer 180 is replaced by renderer 480, and blend value calculator 500 is provided.

Texture map reconstructor 490 is operable to reconstruct a view-independent texture map from a difference image by adding the difference image data to data from the view-independent texture map 400 that has been transformed into the 2D image space of the difference image.

Renderer 480 is operable to render images of the 3D computer model 300 using texture data from the view-independent texture map 400 in a first pass, and using texture data from a view-dependent texture map reconstructed by texture map reconstructor 490 in a second pass. In addition, renderer 480 is operable to blend the rendered image data generated in the second pass with the rendered image data generated in the first pass.

Blend value calculator 500 is operable to calculate pixel blending values for use by renderer 480 in the blending process.

FIG. 10 shows the processing operations performed by processing apparatus 2 of FIG. 8 in the second embodiment.

Referring to FIG. 10, at step S10-2, input data interface 40 stores the input data in memory 30. The input data is the same as that described above in the first embodiment.

At step S10-4, the next camera image 200-214 is selected for processing (this being the first camera image the first time step S10-4 is performed).

At step S10-6, the 3D computer model 300 stored at step S10-2 and a transformation between the 3D space of the model and 2D image space is used to transform the texture data from the view-independent texture map 400 into the image space of the selected camera image, thereby enabling subtraction of the image data to be performed to generate a difference image.

More particularly, renderer 450 renders an image from the viewing position and viewing direction of the camera image selected at step S10-4 and using the same intrinsic camera parameters of the camera used to record the camera image selected at step S10-4. The rendering is performed using texture data from the view-independent texture map 400 in a conventional way, and results in a view-independent "predicted" image corresponding to the selected camera image, with both images having the same number of pixels in the length and width dimensions.

Accordingly, as a result of the processing at step S10-6, the view-independent texture data is transformed to the same 2D image space as the selected camera image.

At step S10-8, difference image generator 460 subtracts the red, green and blue pixel values of the predicted image generated at step S10-6 from the red, green and blue pixel values of the camera image selected at step S10-4 on a pixel-by-pixel basis, and clips the resulting values, to generate a difference image. This subtraction and clipping is performed in the same way as the subtraction and clipping at step S4-6 in the first embodiment, and accordingly will not be described again here.

At step S10-10, texture coordinate calculator 470 performs processing to identify each polygon in the 3D computer model 300 that is fully visible in the camera image selected at step S10-4. In this embodiment, the processing at step S10-10 is performed in the same way as that described in EP-A-1, 204,073 and corresponding co-pending US application 2002-0085748-A1, the full contents of which are incorporated herein by cross-reference.

At step S10-12, texture coordinate calculator 470 stores the positions in the difference image generated at step S10-8 of the vertices of each polygon that is fully visible. As a result, a view-dependent texture map storing difference data is generated.

At step S10-14, it is determined whether all of the camera images 200-214 have been processed in the way described above, and steps S10-4 to S10-14 are repeated until a view-dependent texture map storing difference data has been generated for each camera image.

At step S10-16, encoder 70 encodes each difference image in the same way as in the first embodiment.

At step S10-18, output data interface 80 outputs data as data stored on a storage medium 82 or as data carried by a signal 84. In this embodiment, the output data comprises data defining the 3D computer model 300, the view-independent texture map 400, the encoded difference images generated at step S10-16, the respective viewing position and direction for each difference image, and the intrinsic camera parameters for each difference image.

FIG. 11 shows the processing operations performed by processing apparatus 100 of FIG. 9 in the second embodiment.

Referring to FIG. 11, at step S11-2, the viewing position and direction defined by a user for which an image is to be rendered is read.

At step S11-4, renderer 480 performs first pass rendering by rendering an image from the viewing position and direction read at step S11-2 using texture data from the view-independent texture map 400. This rendering is performed in a conventional way.

It should be noted that the processing at step S11-4 can be performed before data defining the difference images has been received from the processing apparatus 2.

At step S11-6, texture data selector 150 selects an encoded view-dependent texture map storing difference data for rendering, and at step S11-8, decoder 160 decodes the selected view-dependent texture map storing difference data. The processing performed at steps S11-6 and S11-8 is the same as that performed at steps S6-6 and S6-8 in the first embodiment, and accordingly will not be described again here.

It should be noted that the processing at steps S11-6 and S11-8 may be performed in parallel with the processing at step S11-4 if the data defining the view-dependent texture maps storing difference data has been received from processing apparatus 2.

At step S11-10, the 3D computer model and a transformation from the 3D space of the model to 2D image space is used to transform the texture data from the view-independent texture map 400 into the 2D image space of the view-dependent texture map storing difference data decoded at step S11-8 (thereby enabling subsequent addition of the view-independent texture data and the difference image data).

More particularly, renderer 480 uses the texture data from the view-independent texture map 400 to render an image from the viewing position and viewing direction of the view-dependent texture map storing difference data selected at step S11-6 and using the same intrinsic camera parameters as the camera which recorded the corresponding camera image from which the view-dependent texture map storing difference data was generated in processing apparatus 2. As a result, a view-independent predicted image is generated in the same way that a view-independent predicted image was generated at step S10-6 in the processing by processing apparatus 2. Consequently, the view-independent texture data from texture map 400 has been transformed to the same 2D image space as the selected view-dependent texture map storing difference data.

At step S11-12, texture map reconstructor 490 adds the red, green and blue pixel values from the view-dependent texture map storing difference data to the corresponding red, green and blue pixel values in the predicted image generated at step S11-10 on a pixel-by-pixel basis, and clips the resulting red, green and blue values. This addition and clipping is performed in the same way as the addition and clipping at step S6-10 in the first embodiment, and accordingly will not be described again here.

As a result of the processing at step S11-12, the view-dependent texture map is reconstructed, comprising a camera image storing the original camera image data together with the positions of the vertices of the polygons in the 3D computer model 300 that are fully visible in the camera image.

At step S11-14, blend value calculator 500 performs processing to calculate pixel blending values to be used to blend rendered image generated in subsequent second pass rendering using the reconstructed camera image data with the rendered image data generated in the first pass rendering at step S11-4.

FIG. 12 shows the processing operations performed at step S11-14.

Referring to FIG. 12, at step S12-2, pixel blend value calculator 500 selects the next triangle for which texture data is stored in the reconstructed view-dependent texture map (this being the first such triangle the first time step S12-2 is performed).

At step S12-4, pixel blend value calculator 500 calculates a visibility weight for the triangle selected at step S12-2 representative of the visibility of the polygon from the viewing position and direction of the reconstructed view-dependent texture map and also from the viewing position and direction read at step S11-2 of the image to be rendered. More particularly, in this embodiment, pixel blend value calculator 500 calculates a visibility weight $V_w$ in accordance with the following equation;

$$V_w = \cos\theta \cos\alpha \quad (14)$$

where
- $\theta$ is the angle between the surface normal vector of the triangle selected at step S12-2 (that is, a vector perpendicular to the plane of the triangle) and the viewing direction of the reconstructed view-dependent texture map (such that $\cos\theta$ represents the visibility of the triangle in the reconstructed view-dependent texture map); and
- $\alpha$ is the angle between the surface normal vector of the triangle selected at step S12-2 and the viewing direction read at step S11-2 (such that $\cos\alpha$ represents the visibility of the triangle in the image to be rendered).

In this embodiment, if $\cos\theta$ and/or $\cos\alpha$ has a negative value, then the value of $V_w$ is set to 0. Consequently, $V_w$ has the value 0 if the plane of the triangle makes an angle equal to or greater than ±90° with the viewing direction of the image to be rendered.

At step S12-6, pixel blend value calculator 500 determines whether there is another triangle in the 3D computer model 300 for which texture data is stored in the reconstructed view-dependent texture map. Steps S12-2 to S12-6 are repeated until a visibility weight has been calculated for each such triangle in the way described above.

At step S12-8, pixel blend value calculator 500 calculates a respective visibility weight for each triangle vertex defined in the reconstructed view-dependent texture map. More particularly, the visibility weight for each triangle vertex is calculated by calculating the average of the visibility weights $V_w$ calculated at step S12-4 of the triangles which meet at the vertex.

At step S12-10, pixel blend value calculator 500 calculates a respective alpha blending value for each pixel in the image to be rendered. This processing is performed by rendering into the alpha channel using Gouraud rendering and the vertex visibility values calculated at step S12-8. As a result, the vertex visibility values calculated for the vertices of a polygon are linearly interpolated along the edges of the polygon and between edges along scan lines in the images to generate a respective interpolated value for each pixel defining the alpha blending value for the pixel.

Referring again to FIG. 11, at step S11-16, renderer 480 performs second pass rendering using the view-dependent texture map reconstructed at step S11-12 and alpha blending with the alpha values calculated at step S11-14 to combine the image data with the first pass rendering data generated at step S11-4. As a result, the colour component values of each pixel in the rendered image after step S11-16 has been performed are given by:

$$R_F = (1-\alpha)R_1 + \alpha R_2 \quad (15)$$

$$G_F = (1-\alpha)G_1 + \alpha G_2 \quad (16)$$

$$B_F = (1-\alpha)B_1 + \alpha B_2 \quad (17)$$

where
- $R_F$, $G_F$, $B_F$ are the red, green and blue colour component values of the pixel in the final image;
- $\alpha$ is the $\alpha$ blending value for the pixel calculated at step S11-141
- $R_1$, $G_1$, $B_1$ are the red, green and blue colour component values of the pixel after the first rendering pass at step S11-4; and
- $R_2$, $G_2$, $B_2$ are the red, green and blue colour component values from the view-dependent texture map reconstructed at step S11-12 to be added to the pixel.

By performing the second pass rendering at step S11-16 in the way described above, the contribution of image data from the view-dependent texture map reconstructed at step S11-12 may be different for each polygon vertex, and is determined by the visibility of the vertex in the new image to be rendered and the visibility of the vertex in the view-dependent texture map. This variation in the contribution of image data from the view-dependent texture map for different vertices of the 3D computer model 300 blends the image data with the texture data from the first pass rendering in such a way that changes in the image data are reduced when the viewing position and direction of the image to be rendered changes and the view-dependent texture map selected at step S11-6 changes. Consequently, sudden changes in the images seen by the user when the camera image changes are ameliorated.

At step S11-18, central controller 120 controls display controller 80 to display the rendered image data generated at step S11-16 on display device 104.

At step S11-20, it is determined whether a virtual image from a different viewing position and/or direction is to be generated. Steps S11-2 to S11-20 are repeated until images have been rendered from all desired viewing positions and directions.

First Alternative Rendering Technique in the Second Embodiment

A first alternative rendering technique in the second embodiment will now be described.

By way of overview, at steps S11-10 and S11-12 in the second embodiment described above, texture data from the view-independent texture map 400 is transformed into the 2D image space of the view-dependent texture map storing difference data selected at step S11-8, and the transformed view-independent texture data is added to the view-dependent texture data in the 2D image space of the reconstructed view-dependent texture map. On the other hand, in a first modified rendering technique, both view-independent texture data from view-independent texture map 400 and difference data from a view-dependent texture map storing difference data are transformed into the 2D image space of the virtual image to be rendered, and addition of the view-independent texture data and the view-dependent texture data is performed in this common 2D image space.

In this modification, the components of processing apparatus 2 and the processing operations performed thereby are the same as those described above with reference to FIG. 8, with the exception that the data output to processing apparatus 100 need not define the viewing position or the intrinsic camera parameters for each encoded view-dependent texture map storing difference data.

The components of processing apparatus 100 and the processing operations performed thereby are the same as those described above with reference to FIG. 9, with the exception that texture map reconstructor 490 and blend value calculator 500 are omitted, and the blending of rendered data by renderer 480 is different (as will be described below).

FIG. 13 shows the processing operations performed by processing apparatus 100 in the first alternative rendering technique of the second embodiment.

Referring to FIG. 13, the processing at steps S13-2 to S13-8 is the same as the processing performed at steps S11-2 to S11-8. As this processing has been described above, it will not be described again here.

At step S13-10, renderer 480 performs second pass rendering from the viewing position and direction read at step S13-2 using the view-independent texture map storing difference data decoded at step S13-8, and blends the rendered data with the rendered data from the first pass rendering performed at step S13-4. The blending is performed in accordance with equations (9) to (13) above, with the result that view-dependent difference data is added to view-independent texture data from texture map 400 in the 2D image space of the image to be rendered.

At step 513-2, the rendered image data is displayed, and at step S13-14, it is determined whether another virtual image is to be rendered (with steps S13-2 to S13-14 then being repeated as required).

Second Alternative Rendering Technique in the Second Embodiment

A second alternative rendering technique in the second embodiment will now be described.

By way of overview, in the second modified rendering technique, the camera image 200-214 having the viewing direction closest to the viewing direction selected by a user is reconstructed and displayed. As a result, rendering from the actual viewing position and direction selected by the user is not performed, and instead one of the original camera images 200-214 is selected, reconstructed and displayed.

To reconstruct the camera image, view-independent texture data from view-independent texture map 400 is rendered into the 2D image space of the camera image to be reconstructed, and the view-independent texture data is added to the difference data in this 2D image space.

The components of processing apparatus 2 and the processing operations performed thereby are the same as those described above with reference to FIG. 8, with the exception that texture coordinate calculator 470 is omitted, and the processing operations performed at steps S20-10 and S10-12 are omitted (with the result that a difference image for each camera image 200-214 is encoded at step S10-16 without data defining polygon vertex positions therein).

The functional components of processing apparatus 100 and the processing operations performed thereby are the same as those described above with reference to FIG. 9, with the exception that blend value calculator 500 is omitted, that texture map reconstructor 490 now reconstructs a camera image rather than a view-dependent texture map, and that the processing operations of renderer 480 are different (as will be described below).

FIG. 14 shows the processing operations performed by processing apparatus 100 to perform the second modified rendering technique in the second embodiment.

Referring to FIG. 14, at step S14-2, data received from processing apparatus 2 is stored in memory 130. This data defines the 3D computer model 300, the view-independent texture map 400, a respective encoded difference image for each camera image, the respective viewing position and direction of each camera image, and the respective intrinsic camera parameters for each camera image.

At steps S14-4 to S14-8, the viewing position and direction defined by a user for an image to be rendered are read, the encoded difference image having the viewing direction closest to the viewing direction of the image to be rendered is selected, and the selected difference image is decoded. These processing operations are the same as those performed at steps S11-2, S11-6 and S11-B, and accordingly will not be described again here.

At step S14-10, renderer 480 performs processing corresponding to that performed at step S11-10. That is, renderer 480 renders an image from the viewing position and direction of the difference image selected at step S14-6 using the intrinsic camera parameters associated with the selected difference image and using texture data from the view-independent texture map 400. As a result, the view-independent texture data from view-independent texture map 400 is transformed into the 2D image space of the decoded selected difference image (which is the 2D image space of the corresponding camera image).

At step S14-12, texture map reconstructor 490 reconstructs the camera image from the decoded selected difference image by adding the decoded difference image data to the rendered image data generated at step S14-10. This addition is performed in the same way as that described above at step S11-12 using equations (9) to (13).

At step S14-14, renderer 480 renders the camera image data reconstructed at step S14-12 to a display buffer, and at step S14-16, display controller 80 displays the image data from the display buffer on display device 104.

At step S14-18, it is determined whether a different viewing position and/or direction has been specified, with steps S14-4 to S14-18 being repeated as required.

Many modifications and variations can be made to the embodiments described above within the scope of the accompanying claims.

For example, in the embodiments described above, the 3D computer model 300 comprises a plurality of vertices in 3D space connected to form a polygon mesh. However, different forms of 3D computer surface model may be processed. For example, a 3D surface defined by a "point cloud" representation (comprising unconnected points in 3D space representing points on the object surface and a respective surface normal vector for each point) may be processed. In this case, the view-independent texture data comprises a respective red, green and blue value for each 3D point in the point cloud. To perform processing is using a 3D computer model comprising a point cloud, it is more convenient to generate each difference image in the 2D image space of the associated camera image 200-214. Accordingly, the preferred processing for a 3D computer model comprising a point cloud is the processing of the second embodiment described above, with rendering of the 3D points in the point cloud being performed for example using a "splatting" technique, which is well known to those skilled in the art.

In the embodiments described above, texture data selector 150 is provided as part of processing apparatus 100, and processing to select each encoded difference image for rendering is performed within processing apparatus 100. However, instead, texture data selector 150 may be provided as part of processing apparatus 2. In this case, the viewing position and direction specified by the user is transmitted from processing apparatus 100 to processing apparatus 2. Processing apparatus 2 then selects a difference image for rendering, encodes only the selected difference image (and not the other difference images) and transmits the encoded difference image data to processing apparatus 100 for use in rendering.

In the first embodiment described above, texture map generator 50 is provided as part of processing apparatus 2 and processing is performed at step S4-4 to generate a respective extended view-dependent texture map for each camera image. However, instead, each extended view-dependent texture map may be provided as an input to processing apparatus 2, with the result that texture map generator 50 and the processing at step S4-4 may be omitted. In addition, one or more of the extended view-dependent texture maps need not be based on camera image data, and instead may comprise synthetic image data.

If processing to generate the extended view-dependent texture maps is performed in processing apparatus 2 of the first embodiment, then one or more of the extended view-dependent texture maps may be generated using different processing to that described above. For example, image data from a camera image may be extrapolated to generate texture data in the corresponding extended view-dependent texture map.

In the processing at step S4-6 in the first embodiment described above, the view-independent texture map is subtracted from each view-dependent texture map. However, instead, each view-dependent texture map may be subtracted from the view-independent texture map. In this case, instead of performing processing in processing apparatus 100 to add the difference image data to the view-independent texture data in a common 2D image space, processing is performed to subtract the difference image data from the view-independent texture data in a common 2D image space.

Similarly, in the second embodiment, the processing at step S10-8 may subtract the camera image from the predicted image, with processing then being performed in processing apparatus 100 to subtract the difference image data from the view-independent texture data in a common 2D image space.

In the embodiments described above, the data defining the view-independent texture map 400 may be encoded by processing apparatus 2 before output, with the encoded data then being decoded by processing apparatus 100.

In the event that the view-independent texture map is encoded by processing apparatus 2 using the same type of encoding as that used to encode each difference image (or a compatible type of encoding), then processing apparatus 100 may combine the encoded difference image data and the encoded view-independent texture data in a common 2D image space, and then decode the combined data. This form of processing has the advantage that it is only necessary to perform decoding once, instead of twice (once to decode the difference image data, and once to decode the view-independent texture map 400).

In the second embodiment described above, texture coordinate calculator 470 is provided as part of processing apparatus 2, and the processing at steps S10-10 and S10-12 to generate the view-dependent texture maps storing difference data is performed by processing apparatus 2. However, instead, texture coordinate calculator 470 may be provided in processing apparatus 100 and the processing at steps S10-8 and S10-10 may be performed by processing apparatus 100.

In the first embodiment described above, a respective extended view-dependent texture map is generated at step S4-4 for each camera image 200-214. However, one or more extended texture maps may be generated for viewing positions and/or directions different frog those of the camera images.

In the second embodiment described above, the visibility weight for each polygon is calculated at step S12-4 in dependence upon both the visibility of the polygon in the image to be rendered and the visibility of the polygon in the reconstructed view-dependent texture map. However, instead, each visibility weight may be calculated in dependence upon the visibility of the polygon in the image to be rendered alone (such that $V_w = \cos \alpha$) or in dependence upon the visibility of the polygon in the reconstructed view-dependent texture map alone (such that $V_w = \cos \theta$).

In the embodiments described above, an encoded difference image is selected for rendering at steps S6-6, S7-6, S11-6, S13-6 and S14-6 by calculating the respective dot product of the viewing direction for the virtual image entered by the user and the viewing direction of each difference image, and then selecting the encoded difference image having the largest calculated dot product. However, instead, an encoded difference image may be selected for rendering by calculating the respective dot product of the viewing direction defined by the user with each difference image viewing direction (as in the embodiments described above), calculating the respective distance between the viewing position defined by the user and the viewing position of each difference image, dividing each dot product value by the corresponding distance (that is, the distance calculated for the same difference image), and selecting the difference image having the largest resulting value. In this way, the encoded difference image for rendering is selected in dependence upon not only viewing direction but also viewing position.

In the embodiments described above, the input data stored at steps S4-2 and S10-2 defines the intrinsic parameters of the camera(s) which recorded the input images 200-214. However, instead, default values may be assumed for some, or all, of the intrinsic camera parameters, or processing may be performed to calculate the intrinsic parameter values in a conventional manner, for example as described in "Euclidean Reconstruction From Uncalibrated Views" by Hartley in Applications of Invariance in Computer Vision, Mundy, Zisserman and Forsyth eds, pages 237-256, Azores 1993.

In the embodiments described above, processing is performed by a programmable computer using processing routines defined by programming instructions. However, some, or all, of the processing in processing apparatus 2 and processing apparatus 100 could, of course, be performed using hardware.

Other modifications are, of course, possible.

In a number of the embodiments described above, the process of transferring data from processing apparatus 2 to processing apparatus 100 and the rendering process performed by processing apparatus 100 can be summarised as follows:

(1) view-independent texture data Is loaded into processing apparatus 100 before any view-dependent texture data;
(2) processing apparatus 100 uses the view-independent data to render a virtual image and, while this rendering is being performed, view-dependent texture data in loaded into processing apparatus 100;
(3) the view-dependent data is used to modify the virtual image that was initially rendered using the view-independent data. This modification may be performed gradually as the view-dependent data becomes available to processing apparatus 100.

The modification of the initial virtual image may be achieved in a number of different ways. For examples
(a) the original view-dependent data may be reconstructed from the difference data, and then a modified virtual image may be rendered in one pass using the reconstructed view-dependent data;
(b) a two-pass rendering process may be used by merging the difference data in a second rendering pass with the image data initially generated in the first rendering pass using the view-independent data.

It should be noted that the view-dependent data need not be difference data as disclosed in the embodiments above. Instead, the view-dependent data may be a part or whole of a view-dependent texture map.

User input to processing apparatus 100 may be used to determine which view-dependent texture data should be loaded into processing apparatus 100 first. For example, processing to select an encoded difference image for rendering may be performed and the selected difference image loaded into processing apparatus 100 before the other difference images.

Accordingly, the present invention also provides an apparatus and method in which a virtual image is constructed using view-independent data, view-dependent data is read at the same time as the construction of the virtual image, and the view-dependent data is used to modify the virtual image.

The present invention therefore also provides an apparatus and method in which view-independent data is transferred from a first apparatus to a second apparatus and, while the second apparatus is generating a virtual image using the received view-independent data, the first apparatus transfers view-dependent data to the second apparatus.

The invention claimed is:

1. A method of processing data defining a three-dimensional computer model of an object, view-independent texture data for the three-dimensional computer model, view-dependent image data for a plurality of images of the object, and data defining a respective viewing direction for each image in the three-dimensional space, to generate compressed view-dependent image data for the images, the method comprising processing each image by:
defining at least some of the view-independent texture data and the view-dependent image data of the image in the same two-dimensional image space;
subtracting the view-independent texture data and the view-dependent image data in the two-dimensional image space to generate data defining a difference image in the two-dimensional image space;
compression encoding the difference image data; and
rendering an image using the difference image data.

2. A method according to claim 1, wherein the view-independent texture data and the view-dependent image data are defined in the same two-dimensional image space by transforming at least one of the view-independent texture data and the view-dependent image data into the two dimensional image space.

3. A method according to claim 2, wherein the transformation is performed using the three-dimensional computer model.

4. A method according to claim 2, wherein the transformation is performed using a transformation between the three-dimensional space and two-dimensional space.

5. A method according to claim 2, wherein the view-dependent image data of the image is transformed to the two-dimensional image space of a two-dimensional texture map storing the view-independent texture data.

6. A method according to claim 5, wherein the view dependent image data is transformed by processing the image data to define a two-dimensional texture map.

7. A method according to claim 6, wherein the view-dependent image data is transformed by processing the image data to define a two-dimensional texture map storing texture data for parts of the three-dimensional computer model at coordinates within the texture map the same as those in the texture map storing the view independent texture data.

8. A method according to claim 2, wherein at least some of the view-independent texture data is transformed to the two-dimensional image space of the view-dependent image.

9. A method according to claim 8, wherein the at least some view-independent texture, data is transformed by rendering an image of the three-dimensional computer model from the viewing position and direction of the view-dependent image using the view-independent texture data.

10. A method according to claim 1, wherein the view-independent texture data is subtracted from the view-dependent image data in the two-dimensional image space to generate the difference image.

11. A method according to claim 1, further comprising generating a signal carrying data defining the three-dimensional computer model, the encoded difference image data for at least one view-dependent image, and the view-independent texture data.

12. A method according to claim 1, further comprising making a recording, either directly or indirectly, of data defining the three-dimensional computer model, the encoded difference image data for a plurality of view-dependent images and the respective associated viewing directions, and the view-independent texture data.

13. A storage medium storing computer program instructions to program a programmable processing apparatus to become operable to perform a method according to claim 1.

14. A computer-readable medium encoded with computer program instructions to program a programmable processing apparatus to become operable to perform a method according to claim 1.

15. A method of rendering an image of a three-dimensional computer model of an object, comprising:
receiving data defining a difference image, the difference image comprising data defining the difference between view-independent texture data and view-dependent image data;
combining the difference image data with the view-independent texture data in a common two-dimensional image space; and
rendering an image using the combined data.

16. A method according to claim 15, wherein:
the received data defines an encoded difference image;
the encoded difference image is decoded; and
the decoded difference image data is combined with the view-independent texture data in the common two-dimensional image space.

17. A method according to claim 15, wherein:
the received data defines an encoded difference image;
the encoded difference image data is combined with encoded view-independent texture data in the common two-dimensional image space; and
the combined data is decoded.

18. A method according to claim 15, wherein the difference image data is combined with the view-independent texture map data in the two-dimensional image space of a texture map storing the view-independent texture data and an image of the three dimensional computer model is rendered using the combined data from the two-dimensional texture space.

19. A method according to claim 15, wherein at least one of the difference image data and the view-independent texture data is transformed into the common two-dimensional image space prior to combining the data.

20. A method according to claim 19, wherein the transformation is performed using the three-dimensional computer model.

21. A method according to claim 19, wherein the transformation is performed using a transformation between three-dimensional space and two-dimensional space.

22. A method according to claim 19, wherein the view-independent texture data is transformed into the two-dimensional image space of the difference image.

23. A method according to claim 22, wherein an image of the three dimensional computer model is rendered using the combined data from the two-dimensional image space of the difference image from the viewing position and direction of the image to be rendered.

24. A method according to claim 22, wherein the view-independent texture data is transformed by rendering an image of the three-dimensional computer model from the viewing position and direction of the difference image using the view-independent texture data.

25. A method according to claim 19, wherein both the view-independent texture data and the difference image data are transformed into the two-dimensional image space of an image to be rendered, and the transformed data is combined therein.

26. A method according to claim 25, wherein:
the view-independent texture data is transformed by rendering an image of the three-dimensional computer from the viewing position and direction of the image to be rendered using the view-independent texture data; and
the difference image data is transformed by rendering an image of the three-dimensional computer from the viewing position and direction of the image to be rendered using the difference image data.

27. A method according to claim 15, wherein:
the difference image comprises data defining the difference between the view-independent texture data subtracted from the view-dependent image data; and
the difference image data is combined with the view-independent texture data by adding the difference image data and the view-independent texture data in the common two-dimensional image space.

28. A method according to claim 15, wherein:
the difference image comprises data defining the difference between the view-dependent image data subtracted from the view-independent texture data; and
the difference image data is combined with the view-independent texture data by subtracting the difference image data from the view-independent texture data in the common two-dimensional image space.

29. A storage medium storing computer program instructions to program a programmable processing apparatus to become operable to perform a method according to claim 15.

30. A computer-readable medium encoded with computer program instructions to program a programmable processing apparatus to become operable to perform a method according to claim 15.

31. Apparatus operable to process data defining a three-dimensional computer model of an object, view-independent texture data for the three-dimensional computer model, view-dependent image data for a plurality of images of the object and data defining a respective viewing direction for each image in the three-dimensional space to generate compressed view-dependent image data for the images, the apparatus comprising:
a data definer operable to define at least some of the view-independent texture data and the view-dependent image data for an image in a corresponding two-dimensional image space;
a data subtractor operable to subtract the view-independent texture data and the view-dependent image data in the two-dimensional image space to generate data defining a difference image in the two-dimensional image space;
an encoder operable to compression encode the difference image data; and
a renderer to render an image using the difference image data.

32. Apparatus according to claim 31, wherein the data definer is operable to define the view-independent texture data and the view-dependent image data in the same two-dimensional image space by transforming at least one of the view-independent texture data and the view-dependent image data into the two-dimensional image space.

33. Apparatus according to claim 32, wherein the data definer is operable to perform the transformation using the three-dimensional computer model.

34. Apparatus according to claim 32, wherein the data definer is operable to transform the data between three-dimensional space and two-dimensional space.

35. Apparatus according to claim 32, wherein the data definer is operable to transform the view-dependent image data of the image to the two-dimensional image space of a two-dimensional texture map storing the view-independent texture data.

36. Apparatus according to claim 35, wherein the data definer is operable to transform the view-dependent image data by processing the image data to define a two-dimensional texture map.

37. Apparatus according to claim 36, wherein the data definer is operable to transform the view-dependent image data by processing the image data to define a two-dimensional texture map storing texture data for parts of the three-dimensional computer model at coordinates within the texture map the same as those in the texture map storing the view-independent texture data.

38. Apparatus according to claim 32, wherein the data definer is operable to transform at least some of the view-independent texture data to the two-dimensional image space of the view-dependent image.

39. Apparatus according to claim 38, wherein the data definer is operable to transform the at least some view-independent texture data by rendering an image of the three-dimensional computer model from the viewing position and direction of the view-dependent image using the view-independent texture data.

40. Apparatus according to claim 31, wherein the data subtractor is operable to subtract the view-independent texture data from the view-dependent image data in the two-dimensional image space to generate the difference image.

41. Apparatus operable to render an image of a three-dimensional computer model of an object comprising:
a data receiver operable to receive data defining a difference image, the difference image comprising data defining the difference between view-independent texture data and view-dependent image data;
a data combiner operable to combine the difference image data with the view-independent texture data in a common two-dimensional image space; and
a renderer to render an image using the combined data.

42. Apparatus according to claim 41, wherein:
the data receiver is operable to receive data defining an encoded difference image;
the apparatus further comprises a decoder operable to decode the difference image; and
the data combiner is operable to combine the decoded difference image data with the view-independent texture data in the common two-dimensional image space.

43. Apparatus according to claim 41, wherein:
the data receiver is operable to receive data defining an encoded difference image;
the data combiner is operable to combine the encoded difference image data with encoded view-independent texture data in the common two-dimensional image space; and
the apparatus further comprises a decoder operable to decode the encoded combined data.

44. Apparatus according to claim 41, wherein:
the data combiner is operable to combine the difference image data with the view-independent texture map data in the two-dimensional image space of a texture map storing the view-independent texture data; and
the renderer is operable to render an image of the three dimensional computer model using the combined data from the two-dimensional texture space.

45. Apparatus according to claim 41, further comprising a data transformer operable to transform at least one of the difference image data and the view-independent texture data into the common two-dimensional image space prior for combination therein by the data combiner.

46. Apparatus according to claim 45, wherein the data transformer is operable to perform the transformation using the three-dimensional computer model.

47. Apparatus according to claim 45, wherein the data transformer is operable to transform data between three dimensional space and two-dimensional space.

48. Apparatus according to claim 45, wherein the data transformer is operable to transform the view-independent texture data into the two-dimensional image space of the difference image.

49. Apparatus according to claim 48, wherein the renderer operable to render an image of the three dimensional computer model using the combined data from the two-dimensional image space of the difference image from the viewing position and direction of the image to be rendered.

50. Apparatus according to claim 48, wherein the data transformer is operable to transform the view-independent texture data by rendering an image of the three-dimensional computer model from the viewing position and direction of the difference image using the view-independent texture data.

51. Apparatus according to claim 45, wherein the data transformer is operable to transform both the view-independent texture data and the difference image data into the two-dimensional image space of an image to be rendered, and the data combiner is operable to combine the transformed data in the two-dimensional image space of the image to be rendered.

52. Apparatus according to claim 51, wherein the data transformer is operable to:
transform the view-independent texture data by rendering an image of the three-dimensional computer model from the viewing position and direction of the image to be rendered using the view-independent texture data;
and transform the difference image data by rendering an image of the three-dimensional computer model from the viewing position and direction of the image to be rendered using the difference image data.

53. Apparatus according to claim 41, wherein:
the difference image comprises data defining the difference between the view-independent texture data subtracted from the view-dependent image data; and
the data combiner is operable to combine the difference image data with the view-independent texture data by adding the difference image data and the view-independent texture data in the common two-dimensional image space.

54. Apparatus according to claim 41, wherein:
the difference image comprises data defining the difference between the view-dependent image data subtracted from the view-independent texture data; and
the data combiner is operable to combine the difference image data with the view-independent texture data by subtracting the difference image data from the view-independent texture data in the common two-dimensional image space.

55. Apparatus for processing data defining a three-dimensional computer model of an object, view independent texture data for the three-dimensional computer model, view-dependent image data for a plurality of images of the object, and data defining a respective viewing direction for each image in the three-dimensional space, to generate compressed view-dependent image data for the images, the apparatus comprising:
means for defining at least some of the view-independent texture data and the view-dependent image data for an image in a corresponding two-dimensional image space;

means for subtracting the view-independent texture data and the view-dependent image data in the two-dimensional image space to generate data defining a difference image in the two-dimensional image space;

means for compression encoding the difference image data; and means for rendering an image using the difference image data.

56. Apparatus for rendering an image of a three-dimensional computer model of an object, comprising:

means for receiving data defining a difference image, the difference image comprising data defining the difference between view-independent texture data and view-dependent image data;

means for combining the difference image data with the view-independent texture data in a common two-dimensional image space; and means for rendering an image using the combined data.

* * * * *